(12) United States Patent
Parichehrehteroujeni et al.

(10) Patent No.: US 12,143,872 B2
(45) Date of Patent: Nov. 12, 2024

(54) REPORTING OF SUCCESSFUL HANDOVER TO A TARGET CELL

(71) Applicant: Telefonaktiebolaget LM Ericsson (PUBL), Stockholm (SE)

(72) Inventors: Ali Parichehrehteroujeni, Linköping (SE); Pradeepa Ramachandra, Linköping (SE); Malik Wahaj Arshad, Stockholm (SE); Icaro L. J. Da Silva, Solna (SE); Angelo Centonza, Torrenueva Costa Granada (ES); Fredrik Gunnarsson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 411 days.

(21) Appl. No.: 17/429,877

(22) PCT Filed: Feb. 13, 2020

(86) PCT No.: PCT/SE2020/050165
§ 371 (c)(1),
(2) Date: Aug. 10, 2021

(87) PCT Pub. No.: WO2020/167237
PCT Pub. Date: Aug. 20, 2020

(65) Prior Publication Data
US 2022/0141725 A1    May 5, 2022

Related U.S. Application Data

(60) Provisional application No. 62/805,708, filed on Feb. 14, 2019.

(51) Int. Cl.
*H04W 36/00*    (2009.01)
*H04B 7/06*    (2006.01)
(Continued)

(52) U.S. Cl.
CPC ...... *H04W 36/0058* (2018.08); *H04B 7/0695* (2013.01); *H04W 36/00837* (2018.08); *H04W 36/305* (2018.08); *H04W 76/19* (2018.02)

(58) Field of Classification Search
CPC ....... H04W 36/0058; H04W 36/00837; H04W 76/19; H04W 36/305; H04B 7/0695
See application file for complete search history.

(56) References Cited

U.S. PATENT DOCUMENTS

2010/0173626 A1   6/2010   Catovic et al.
2011/0002304 A1   1/2011   Lee et al.
(Continued)

FOREIGN PATENT DOCUMENTS

CN    102131257 A    7/2011
CN    103329597 A    9/2013
(Continued)

OTHER PUBLICATIONS

3GPP TS 38.401 v15.4.0; Technical Specification; 3rd Generation Partnership Project; Technical Specification Group Radio Access Network; NG-RAN; Architecture description (Release 15)—Dec. 2018.
(Continued)

*Primary Examiner* — Derrick V Rose
(74) *Attorney, Agent, or Firm* — Weisberg I.P. Law, P.A.

(57) ABSTRACT

A method performed by a wireless device includes, in response to a successful handover procedure, compiling a successful handover report comprising state information of the wireless device. The successful handover report is transmitted to a target cell.

18 Claims, 18 Drawing Sheets

(51) Int. Cl.
*H04W 36/30* (2009.01)
*H04W 76/19* (2018.01)

(56) References Cited

U.S. PATENT DOCUMENTS

| | | | |
|---|---|---|---|
| 2012/0002643 A1 | 1/2012 | Chung et al. | |
| 2013/0150023 A1 | 6/2013 | Kim et al. | |
| 2014/0050197 A1* | 2/2014 | Legg | H04W 36/0058 370/331 |
| 2014/0376363 A1* | 12/2014 | Park | H04W 36/165 370/225 |
| 2015/0063311 A1 | 3/2015 | Chindapol et al. | |
| 2015/0208280 A1 | 6/2015 | Lorca Hernando | |
| 2015/0264601 A1 | 9/2015 | Cha | |
| 2021/0168678 A1* | 6/2021 | Deenoo | H04W 76/19 |
| 2021/0204181 A1* | 7/2021 | Chen | H04W 12/041 |
| 2022/0053388 A1* | 2/2022 | Kim | H04W 36/0044 |
| 2022/0060953 A1* | 2/2022 | Lee | H04W 36/362 |

FOREIGN PATENT DOCUMENTS

| | | | |
|---|---|---|---|
| CN | 103313275 B | 8/2018 | |
| GB | 2472789 A | 2/2011 | |
| WO | 2013 172638 A1 | 11/2013 | |
| WO | 2018 172600 A1 | 9/2018 | |

OTHER PUBLICATIONS

PCT International Search Report issued for International application No. PCT/SE2020/050165—May 26, 2020.

PCT Written Opinion of the International Searching Authority issued for International application No. PCT/SE2020/050165—May 26, 2020.

3GPP TS 38.331 v15.4.0; Technical Specification; 3rd Generation Partnership Project; Technical Specification Group Radio Access Network; NR; Radio Resource Control (RRC) protocol specification (Release 15)—Dec. 2018.

European Search Report issued for Application No. / Patent No. 20754912.2-1212 / 3925295—Mar. 17, 2022.

3GPP TSG-RAN WG3 #105; Ljubljana, SI; Source: Ericsson; Title: On the Use Case of RLF Related Information upon a Successful Handover (R3-194285)—Aug. 26-30, 2019.

Chinese Office Action with English machine translation dated Nov. 30, 2023 for Patent Application No. 202080020841.2, consisting of 11-pages.

* cited by examiner

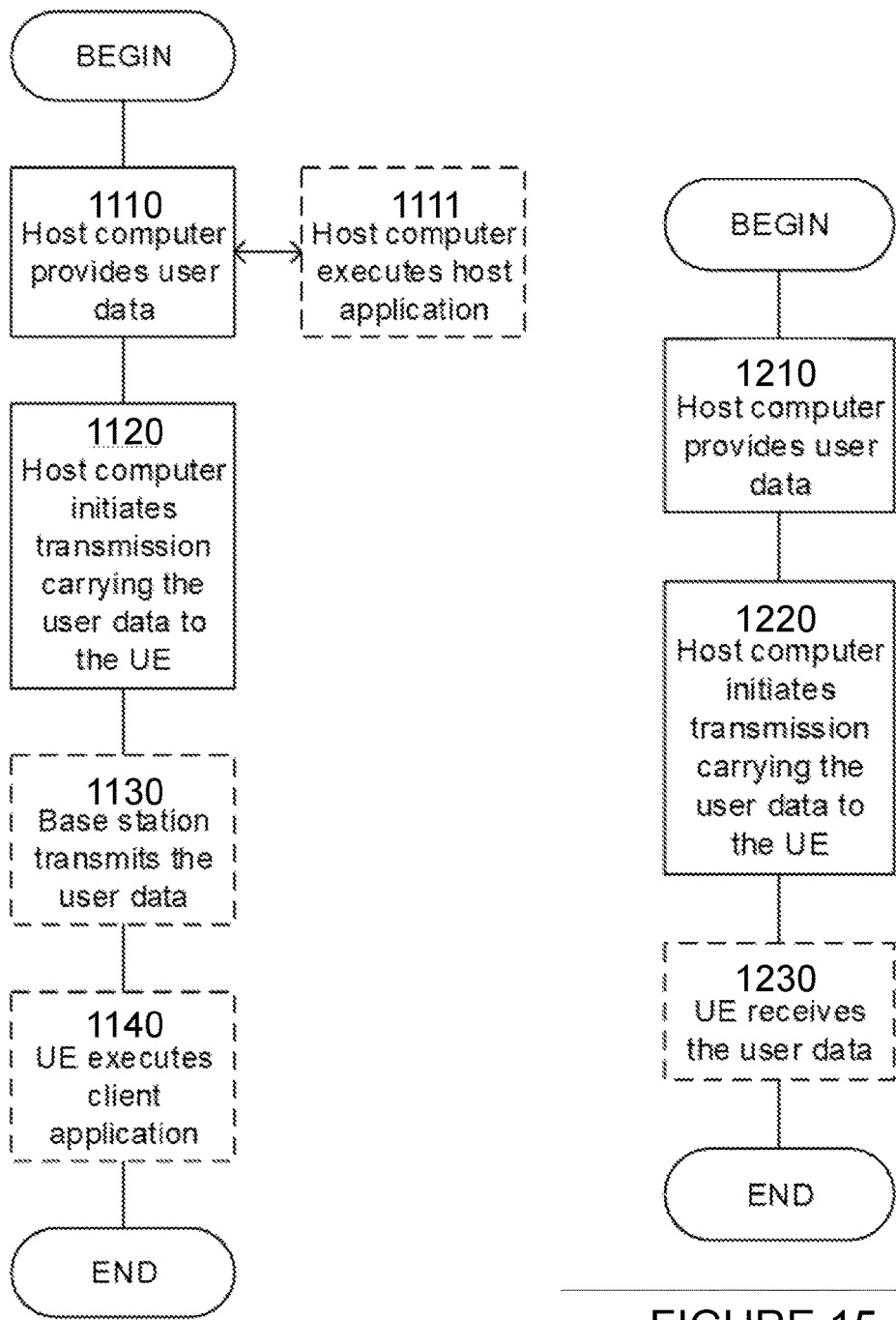

REPORTING OF SUCCESSFUL HANDOVER TO A TARGET CELL

PRIORITY

This nonprovisional application is a U.S. National Stage Filing under 35 U.S.C. § 371 of International Patent Application Serial No. PCT/SE2020/050165 filed Feb. 13, 2020 and entitled "REPORTING OF SUCCESSFUL HANDOVER TO A TARGET CELL" which claims priority to U.S. Provisional Patent Application No. 62/805,708 filed Feb. 14, 2019 both of which are hereby incorporated by reference in their entirety.

TECHNICAL FIELD

The present disclosure relates, in general, to wireless communications and, more particularly, systems and methods for the reporting of successful handover to a target cell.

BACKGROUND

The current 5G RAN (NG-RAN) architecture as described in $3^{rd}$ Generation Partnership Project (3GPP) TS 38.401v15.4.0 is depicted in FIG. 1.

The Next Generation Radio Access Network (NG-RAN) consists of a set of gNodeBs (gNBs) connected to the 5G Core Network (5GC) through the NG. An gNB can support Frequency Division Duplex (FDD) mode, Time Division Duplex (TDD) mode or dual mode operation. gNBs can be interconnected through the Xn interface. A gNB may consist of a gNB Central Unit (gNB-CU) and gNB Distributed Units (gNB-DUs). A gNB-CU and a gNB-DU are connected via an F1 logical interface. One gNB-DU is connected to only one gNB-CU. For resiliency, a gNB-DU may be connected to multiple gNB-CUs by appropriate implementation. NG, Xn and F1 are logical interfaces. The NG-RAN is layered into a Radio Network Layer (RNL) and a Transport Network Layer (TNL). The NG-RAN architecture, which includes the NG-RAN logical nodes and interfaces between them, is defined as part of the RNL. For each NG-RAN interface, including NG, Xn, and F1, the related TNL protocol and the functionality are specified. The TNL provides services for user plane transport and signalling transport.

A gNB may also be connected to a Long Term Evolution (LTE) eNodeB (eNB) via the X2 interface. Another architectural option is that where an LTE eNB connected to the Evolved Packet Core (EPC) network is connected over the X2 interface with a so called nr-gNB. The latter is a gNB not connected directly to a Core Network (CN) and connected via X2 to an eNodeB (eNB) for the sole purpose of performing dual connectivity.

The architecture in FIG. 1 can be expanded by spitting the gNB-CU into two entities. The first entity is the gNB-CU-User Plane (gNB-CU-UP), which serves the user plane and hosts the Packet Data Convergence Protocol (PDCP) protocol. The other entity is the gNB-CU-Control Plane (gNB-CU-CP), which serves the control plane and hosts the PDCP and Radio Resource Control (RRC) protocol. For completeness, a gNB-DU hosts the Radio Link Control (RLC)/Medium Access Control (MAC)/PHY protocols.

Seamless handovers are a key feature of 3GPP technologies. Successful handovers ensure that the user equipment (UE) moves around in the coverage area of different cells without causing too much interruptions in the data transmission. However, there will be scenarios when the network fails to handover the UE to the "correct" neighbor cell in time and, in such scenarios, the UE will declare a radio link failure (RLF). The RLF will cause a poor user experience as the RLF is declared by the UE only when it realizes that there is no reliable communication channel (e.g., radio link) available between itself and the network. The cause for the radio link failure could be one of the following:

1) Expiry of the radio link monitoring related timer T310;
2) Expiry of the measurement reporting associated timer T312 (not receiving the handover command from the network within this timer's duration despite sending the measurement report when T310 was running);
3) Upon reaching the maximum number of RLC retransmissions; and
4) Upon receiving random access problem indication from the MAC entity.

Upon declaring the RLF, the UE performs a re-establishment procedure. Before the standardization of Mobility Robustness Optimization (MRO) related report handling in the network, only the UE was aware of some statistics associated with what the radio quality looked like at the time of RLF, what is the actual reason for declaring RLF, etc. For the network to identify the reason for the RLF, the network needs more information, both from the UE and also from the neighboring base stations.

As part of the MRO solution in LTE, a RLF reporting procedure was introduced in the RRC specification in Rel-9 RAN2 work. The contents of the measurement report have been enhanced with more details in the subsequent releases. Some of the measurements included in the measurement report based on the latest LTE RRC specification are:

1) Measurement quantities (Reference Signal Received Power (RSRP), Reference Signal Received Quality (RSRQ)) of the last serving cell (PCell).
2) Measurement quantities of the neighbor cells in different frequencies of different Radio Access Technologies (RATs) (e.g., EUTRA, UTRA, GERAN, CDMA2000).
3) Measurement quantity (e.g., Received Signal Strength Indicator (RSSI)) associated to WLAN Aps.
4) Measurement quantity (e.g., RSSI) associated to Bluetooth beacons.
5) Location information, if available (including location coordinates and velocity).
6) Globally unique identity of the last serving cell, if available, otherwise the Physical Cell Identifier (PCI) and the carrier frequency of the last serving cell.
7) Global unique identity or PCI and carrier frequency of cell where failure occurred (e.g., handover target cell in the case of a too early handover).
8) Time elapsed since the failure occurred.
9) Tracking area code of the PCell.
10) Time elapsed since the last reception of the 'Handover command' message.
11) Cell Radio Network Temporary Identifier (C-RNTI) used in the previous serving cell.
12) Whether or not the UE was configured with a data radio bearer (DRB) having Quality of Service Class Identifier (QCI) value of 1.
13) Type of connection failure (e.g., too late handover, too early HO).
14) RLF failure cause (e.g., T310 expiration, random access problems.

These measurements are typically reported to the cell in which the UE performs reestablishment via the UEInformationRe quest and UEInformationResponse related framework.

Based on the contents of the RLF report (especially the Globally unique identity of the last serving cell), the cell in which the UE reestablishes can forward the RLF report to the last serving cell. The forwarding of the RLF report is done to aid the original serving cell with tuning of the handover related parameters as the original serving cell was the one who had configured the parameters associated to the UE that led to the RLF.

Two different types of inter-node MRO messages have been standardized in LTE, namely: radio link failure indication and handover report.

The radio link failure indication procedure is used to transfer information regarding RRC re-establishment attempts or received RLF reports between eNBs. This message is sent from the eNB in which the UE performs reestablishment to the eNB which was the previous serving cell of the UE. The contents of the RLF indication message is summarized in Table 1 below:

TABLE 1

| IE/Group Name | Presence | Range | IE type and reference | Semantics description | Criticality | Assigned Criticality |
|---|---|---|---|---|---|---|
| Message Type | M | | 9.2.13 | | YES | ignore |
| Failure cell PCI | M | | INTEGER (0 ... 503, ... ) | Physical Cell Identifier | YES | ignore |
| Re-establishment cell ECGI | M | | ECGI 9.2.14 | | YES | ignore |
| C-RNTI | M | | BIT STRING (SIZE (16)) | C-RNTI contained in the RRC Re-stablishment Request message (TS 36.331 [9]) | YES | ignore |
| ShortMAC-I | O | | BIT STRING (SIZE (16)) | ShortMAC-I contained in the RRC Re-establishment Request message (TS 36.331 [9]) | YES | ignore |
| UE RLF Report Container | O | | OCTET STRING | RLF -Report-r IE contained in the UEInformationResponse message (TS 36.331 [9]) | YES | ignore |
| RRC Conn Setup Indicator | O | | ENUMERATED(RRC Conn Setup, ... ) | Included if the RLF Report within the UE RLF Report Container IE is retrieved after an RRC connection setup or an incoming successful handover | YES | reject |
| RRC Conn Reestab Indicator | O | | ENUMERATED(reconfigurationFailure, handoverFailure, otherFailure, ... ) | The Reestablishment Cause in RRCConnectionReestablishmentRequest message(TS 36.331 [9]) | YES | ignore |
| UE RLF Report Container for extended bands | O | | OCTET STRING | RLF-Report-v9e0 IE contained in the UEInformationResponse message (TS 36.331 [9]) | YES | ignore |

Based on the RLF report from the UE and the knowledge about which cell did the UE reestablish itself, the original source cell can deduce whether the RLF was caused due to a coverage hole or due to handover associated parameter configurations. If the RLF was deemed to be due to handover associated parameter configurations, the original serving cell can further classify the handover related failure as too-early, too-late or handover to wrong cell classes. These handover failure classes are explained in brief below:

1) Whether the handover failure occurred due to the "too-late handover" cases
   a. The original serving cell can classify a handover failure to be "too late handover" when the original serving cell fails to send the handover command to the UE associated to a handover towards a particular target cell and if the UE reestablishes itself in this target cell post RLF.
   b. An example corrective action from the original serving cell could be to initiate the handover procedure towards this target cell a bit earlier by decreasing the cell individual offset (CIO) towards the target cell that controls when the IE sends the event triggered measurement report that leads to taking the handover decision.

2) Whether the handover failure occurred due to the "too-early handover" cases
   a. The original serving cell can classify a handover failure to be "too early handover" when the original serving cell is successful in sending the handover command to the UE associated to a handover however the UE fails to perform the random access towards this target cell.
   b. An example corrective action from the original serving cell could be to initiate the handover procedure towards this target cell a bit later by increasing the CIO towards the target cell that controls when the IE sends the event triggered measurement report that leads to taking the handover decision.

3) Whether the handover failure occurred due to the "handover-to-wrong-cell" cases
   a. The original serving cell can classify a handover failure to be 'handover-to-wrong-cell' when the original serving cell intends to perform the handover for this UE towards a particular target cell but the UE declares the RLF and reestablishes itself in a third cell.
   b. A corrective action from the original serving cell could be to initiate the measurement reporting procedure that leads to handover towards the target cell a bit later by decreasing the CIO towards the target cell or via initiating the handover towards the cell in which the UE reestablished a bit earlier by increasing the CIO towards the reestablishment cell.

To aid the serving cell in classifying a handover as "too-late" handover, the RLF reporting from the reestablishment cell to the original source cell is enough. To classify a handover as "too early" or "handover to wrong cell," the serving cell may further benefit from "handover report" message which may include the parameters listed in Table 2:

handover procedure may work with more performance variations, so that the UE may observes some issues in the physical layer while the handover is performed successfully.

In the case of a Handover failure such as, for example, due to the expiry of timer T304 or when lower layers indicate RACH failures due to the maximum number of RACH attempts being reached, the UE logs information in an RLF that aims to indicate to the source cell where the failure has

TABLE 2

| IE/Group Name | Presence | Range | IE type and reference | Semantics description | Criticality | Assigned Criticality |
|---|---|---|---|---|---|---|
| Message Type | M | | 9.2.13 | | YES | ignore |
| Handover Report Type | M | | ENUMERATED (HO too early, HO to wrong cell, . . . InterRAT ping-pong) | | YES | ignore |
| Handover Cause | M | | Cause 9.2.6 | Indicates handover cause employed for handover from $eNB_2$ | YES | ignore |
| Source cell ECGI | M | | ECGI 9.2.14 | ECGI of source cell for handover procedure (in $eNB_2$) | YES | ignore |
| Failure cell ECGI | M | | ECGI 9.2.14 | ECGI of target cell for handover procedure (in $eNB_1$) | YES | ignore |
| Re-establishment cell ECGI | C-ifHandoverReportType HoToWrongCell | | ECGI 9.2.14 | ECGI of cell where UE attempted re-establishment | YES | ignore |
| Target cell in UTRAN | C-ifHandoverReportType InterRATpingpong | | OCTET STRING | Encoded according to UTRAN Cell ID in the Last Visited UTRAN Cell Information IE, as defined in in TS 25.413 [24] | YES | ignore |
| Source cell C-RNTI | O | | BIT STRING (SIZE (16)) | C-RNTI allocated at the source eNB (in $eNB_2$) contained in the AS-config (TS 36.331 [9]). | YES | ignore |
| Mobility Information | O | | BIT STRING (SIZE (32)) | Information provided in the HANDOVER REQUEST message from $eNB_2$. | YES | ignore |
| UE RLF Report Container | O | | OCTET STRING | The UE RLF Report Container IE received in the RLF INDICATION message. | YES | ignore |
| UE RLF Report Container for extended bands | O | | OCTET STRING | The UE RLF Report Container for extended bands IE received in the RLF INDICATION message. | YES | ignore |

| Condition | Explanation |
|---|---|
| ifHandoverReportType HoToWrongCell | This IE shall be present if the Handover Report Type IE is set to the value "HO to wrong cell" |
| ifHandoverReportType InterRATpingpong | This IE shall be present if the Handover Report Type IE is set to the value "InterRAT ping-pong" |

There currently exist certain challenge(s). For example, the handover associated problems that were identified during LTE are expected to be potentially applicable in New Radio (NR) as well. In a typical implementation of NR handover procedure, like LTE, the handover is based on the measurement reports sent by the UE. Considering the wide range of frequencies in which the NR is expected to operate (sub GHz to mmW bands), and the beam structure with which reference signals are framed, the reference signals will have more abrupt channel fluctuations compared to more robust reference signals used in LTE. Further, the beam-based random access channel (RACH) access procedures make the handover procedure subject to sub-optimal performance linked to the efficiency of specific beams. In fact, in NR the occurred what were the radio conditions and other state information at the moment of failure. However, that is only logged when a HO failure is detected.

When it comes to successful handovers, one may argue that the situation in the target cell during RACH may also be known, thanks to RACH reports where information regarding the detection of contention and the number of RACH preamble transmissions may be logged and reported. That allows the target to optimized RACH parameters to speed up the time to access during handovers.

Unfortunately, however, these reports do not cover another category of issues, such as when the UE in the source cell has good enough coverage to receive a HO command but the coverage is not good enough to achieve high data rates. In other terms, the reports do not cover when it would have been better for the UE to be moved to another cell before the time where a successful handover has happened.

In NR, successful handover lends itself to even more careful considerations. Therefore, the framework designed to improve the mobility robustness in LTE needs further consideration on some finer cases, and in particular, successful handovers. Issues related to the successful handovers can be formulated and measured in the framework of new reports, which can address different aspects where some underlying issues can be detected and reported to the network.

SUMMARY

Certain aspects of the present disclosure and their embodiments may provide solutions to these or other challenges. For example, certain embodiments provide systems and methods for reporting of successful handover to a target cell.

According to certain embodiments, a method performed by a wireless device includes, in response to a successful handover procedure, compiling a successful handover report comprising state information of the wireless device. The successful handover report is transmitted to a target cell.

According to certain embodiments, a wireless device includes processing circuitry configured to, in response to a successful handover procedure, compile a successful handover report comprising state information of the wireless device and transmit the successful handover report to a target cell.

According to certain embodiments, a method performed by a network node includes receiving a successful handover report associated with a successful handover by a wireless device and performing one or more operations based on information in the successful handover report.

According to certain embodiments, a network node includes processing circuitry configured to receive a successful handover report associated with a successful handover by a wireless device and perform one or more operations based on information in the successful handover report Certain embodiments may provide one or more of the following technical advantage(s). For example, certain embodiments may advantageously help the network to enhance the handover performance by detecting the issues beneath the handover procedure associated to the radio link monitoring while the handover has been successfully performed by UE. As another example, by reporting the successful handover related issues, the UE does not require any extra effort, as the UE may keep the RLF related timers running until a HO command is received and handover procedure is started.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 14 illustrates a method implemented in a communication system, according to one embodiment;

FIG. 15 illustrates another method implemented in a communication system, according to one embodiment;

DETAILED DESCRIPTION

Figure 1:
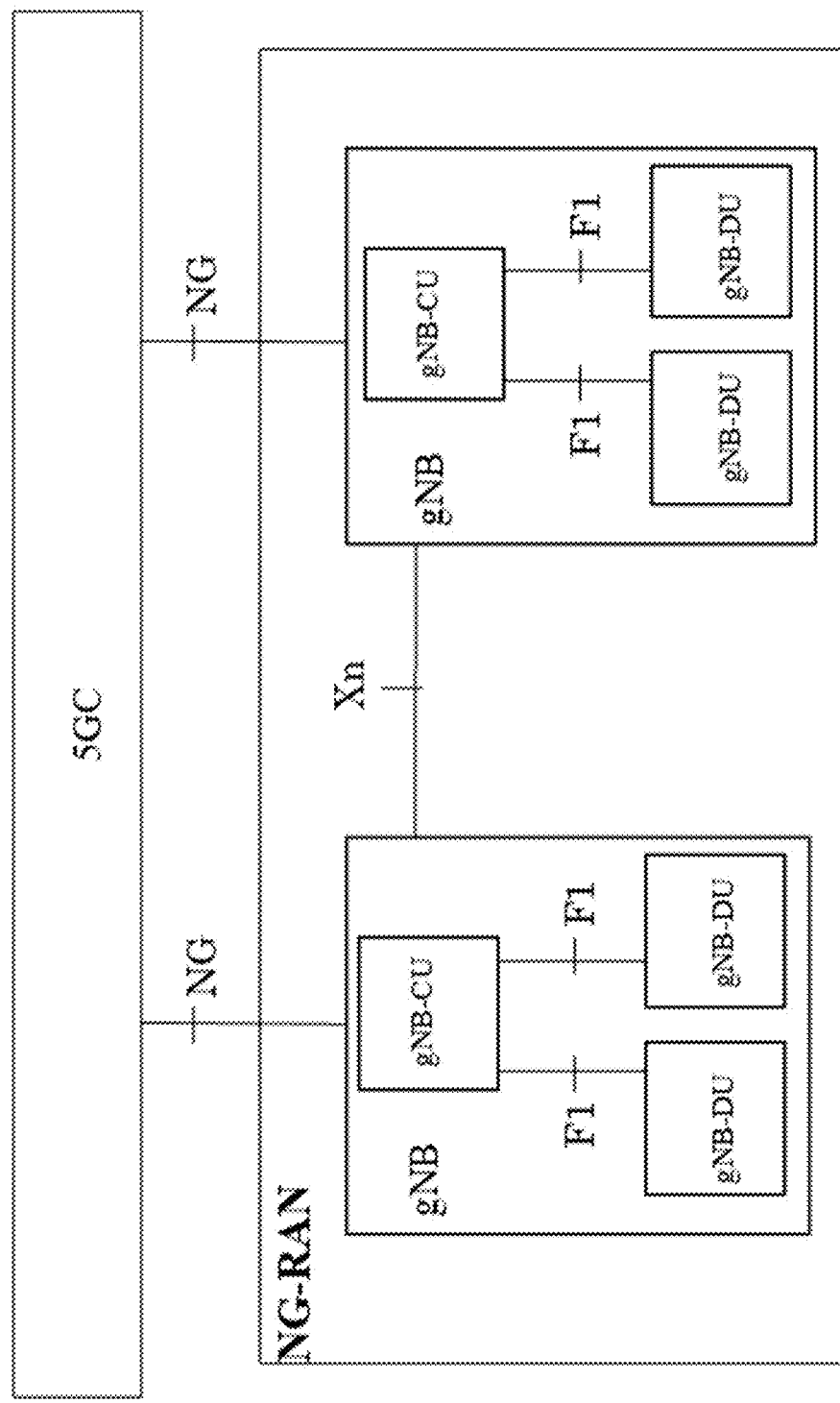
FIG. 1 illustrates the current 5G RAN (NG-RAN) architecture as described in 3$^{rd}$ Generation Partnership Project (3GPP) TS 38.401v15.4.0.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Certain aspects of the present disclosure and their embodiments may provide solutions to one or more of the challenges described above. For example, according to certain embodiments, triggers and configurations are provided for beam measurement reporting upon accessing a target cell during handovers, conditional handovers, Secondary Cell Group (SCG) changes, and SCG additions are disclosed, where the former two include the EN-DC scenario.

According to one example embodiment, a method at the user equipment (UE) is disclosed for compiling a report such as, for example, a successful handover report that includes state information of the UE, which may include, for example, information related to the source or target cell. The state information of the UE may comprise information such as handover timers values such as, for example how much time it took until the UE accesses the target and/or time elapsed of timer T304. The state information may also include information related to RLF related timers such as, for example, whether T304, T310, and/or T312 timers have been started or not and how much time has elapsed if the timers have been started. The state information can also include information related to Radio Link Failure (RLF) counters such as, for example, a value of N310, a number of Out-of-Sync (OOS) events, a number of In-Sync (IS) events, etc. Additionally, the state information may include information related to a Radio Link Control (RLC) retransmission counter and relevant measurement upon a successful handover at the target cell, while some of the mentioned timers or counters are running. In certain embodiments, the report may be sent to the target cell unfacilitated or on demand if the availability of the report has been indicated. In certain embodiments, the corresponding information can be sent by the UE to the source node associated to the serving cell and it can be used for a number of optimization actions such as to optimize the coverage mapping of link beams and control beams.

In certain embodiments, reporting to the target Radio Access Node (RAN) node of RLM issues' related information is described.

In certain embodiments, the information reported to the target cell is described.

In certain embodiments, messages to the target cell in which this information is reported are described.

In certain embodiments, messages from the target node to the source node are described.

In certain embodiments, messages from Central Unit (CU) to Distributed Unit (DU) at source node are described.

In the following figures, the flow charts of the operations performed by the UE and network are illustrated.

According to certain embodiments, a method performed by a wireless device is disclosed. The method comprises in response to a successful handover procedure, generating a successful handover report comprising state information of the wireless device. The method comprises transmitting the successful handover report to a target cell.

Figure 2:
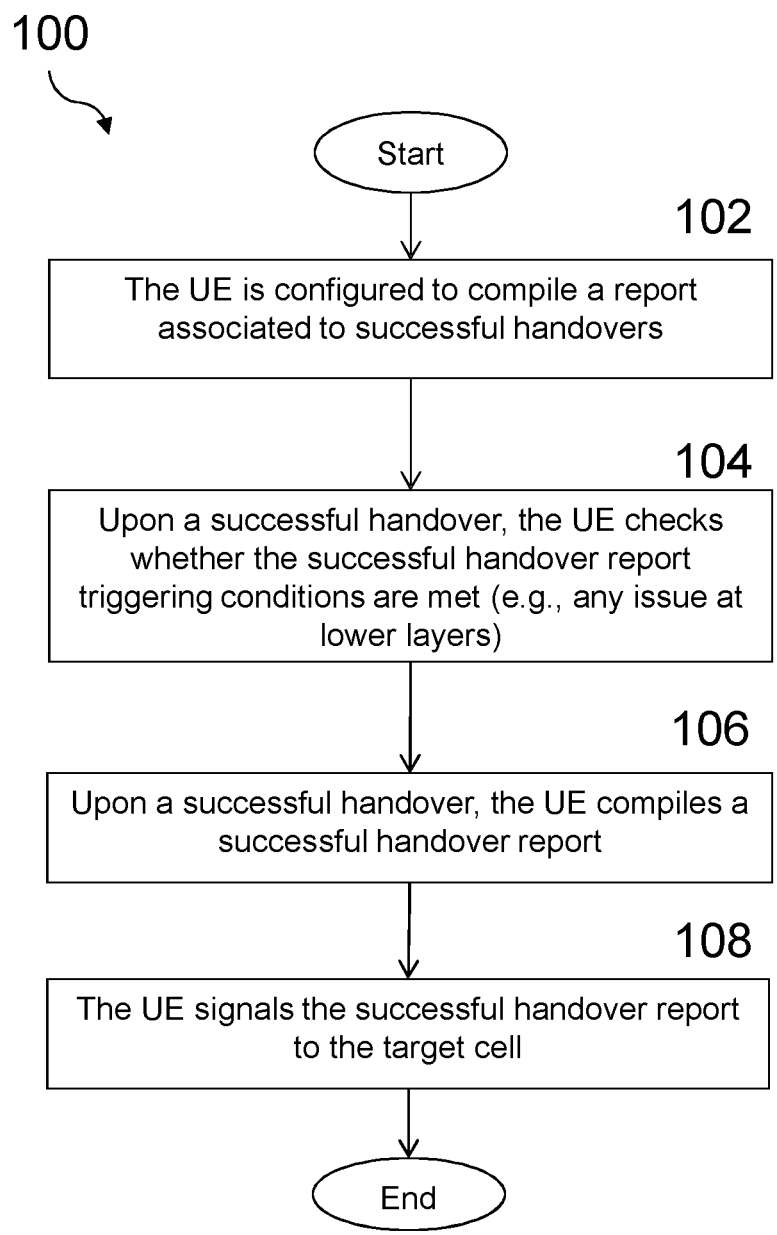
FIG. 2 illustrates a flow diagram of a method for handover reporting from the perspective of a UE, according to certain embodiments.

FIG. 2 illustrates a flow diagram of a method 100 for handover reporting from the perspective of a UE, according to certain embodiments. At step 102, the UE is configured to compile a report associated to successful handovers. At step 104, upon a successful handover, the UE checks whether successful handover report triggering conditions is met. For example, the UE may determine whether there are any issues at lower layers. At step 106, upon a successful handover, the UE compiles a successful handover report. At step 108, the UE signals the successful handover report to the target cell.

In certain embodiments, the method may further comprise receiving a configuration for the successful handover report. In certain embodiments, the method may further comprise determining whether a successful handover report trigger condition has been met. In certain embodiments, the method may further comprise receiving a request for the successful handover report from the target cell. In certain embodiments, the successful handover report may be transmitted to the target cell in response to the received request.

In certain embodiments, the successful handover report may comprise information related to a source cell or the target cell. In certain embodiments, the successful handover report may comprise information indicating that the wireless device is in near-RLF condition. In certain embodiments, the successful handover report may comprise information about one or more radio link monitoring-related timers. In certain embodiments, the successful handover report may comprise information about a radio link control retransmission counter.

In certain embodiments, the method may further comprise logging one or more measurements related to a beam failure detection procedure on a serving cell.

In certain embodiments, the successful handover report may comprise one or more of: one or more beam identities for which random access channel access was attempted and for each beam identity, a number of random access channel access attempts. In certain embodiments, the successful handover report may comprise one or more of: sensor captured data or measurements and a speed state of the wireless device.

In certain embodiments, the successful handover report may comprise one or more of: one or more reference signal received power measurements for configured reference signals at the time of successful handover; one or more reference signal received quality measurements for configured reference signals at the time of successful handover; and one or more signal-to-interference-plus-noise ratio measurements for configured reference signals at the time of successful handover.

In certain embodiments, the successful handover report may comprise position information at the time of successful handover.

In certain embodiments, the successful handover report may be included in a Handover Complete message (RRCReconfigurationComplete) sent over radio resource control from the wireless device to the target cell.

In certain embodiments, the method may further comprise indicating presence of successful handover report to the network using a binary flag.

In certain embodiments, the successful handover report may be included in a RRCRe-establishmentRequest message.

In certain embodiments, the method may further comprise providing user data and forwarding the user data to a host computer via the transmission to the base station.

According to another example embodiment, a method in a network node is disclosed. The method comprises receiving a successful handover report associated with a successful handover by a wireless device. The method comprises performing one or more operations based on information in the successful handover report.

Figure 3:
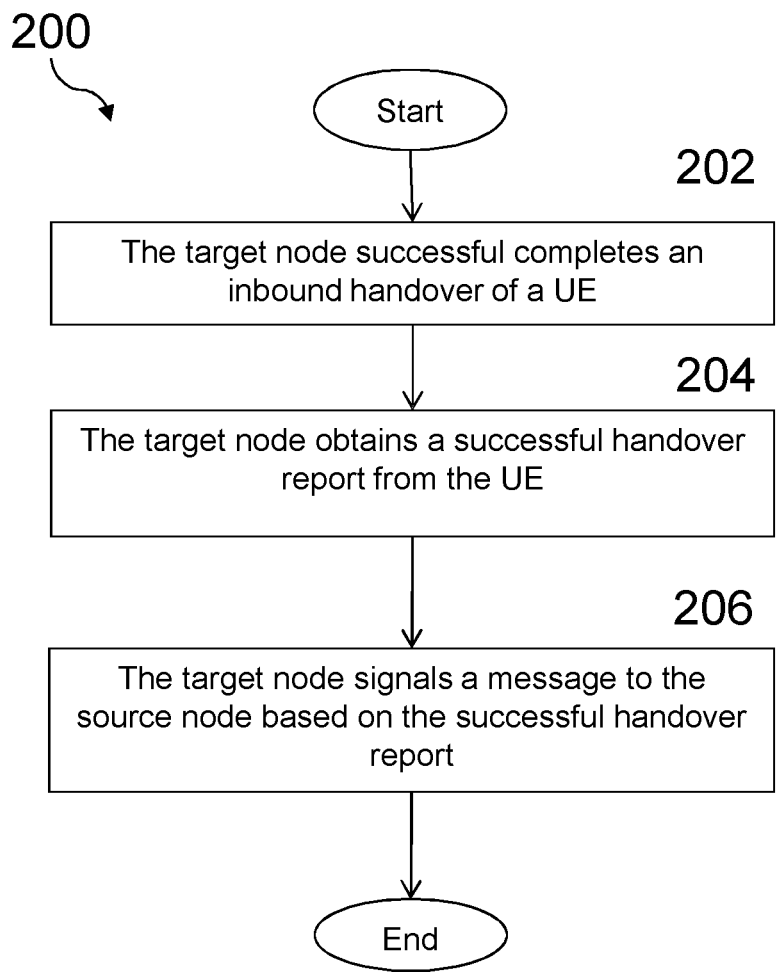
FIG. 3 illustrates a method for handover reporting from the perspective of a target cell, according to certain embodiments.

FIG. 3 illustrates a method 200 for handover reporting from the perspective of a target cell, according to certain embodiments. At step 202, the target node successfully completes an inbound handover of a UE. At step 204, the target node obtains a successful handover report from the UE. At step 206, the target node signals a message to the source node based on the successful handover report.

In certain embodiments, the successful handover report may comprise information related to a source cell or a target cell. In certain embodiments, the successful handover report may comprise information indicating that the wireless device is in near-RLF condition. In certain embodiments, the successful handover report may comprise information about one or more radio link monitoring-related timers. In certain embodiments, the successful handover report may comprise information about a radio link control retransmission counter.

In certain embodiments, the successful handover report may comprise one or more measurements related to a beam failure detection procedure. In certain embodiments, the successful handover report may comprise one or more of: one or more beam identities for which random access channel access was attempted and for each beam identity, a number of random access channel access attempts.

In certain embodiments, the successful handover report may comprise one or more of: sensor captured data or measurements and a speed state of the wireless device. In certain embodiments, the successful handover report may comprise one or more of: one or more reference signal received power measurements for configured reference signals at the time of successful handover; one or more reference signal received quality measurements for configured reference signals at the time of successful handover; and one or more signal-to-interference-plus-noise ratio measurements for configured reference signals at the time of successful handover. In certain embodiments, the successful handover report may comprise position information at the time of successful handover.

In certain embodiments, the network node may be a target node, and the method may comprise receiving the successful handover report associated with the successful handover from the wireless device. In certain embodiments, the method may further comprise sending a request for the successful handover report to the wireless device. In certain embodiments, the successful handover report may be received in response to the request. In certain embodiments, the successful handover report may be included in a Handover Complete message (RRCReconfigurationComplete) sent over radio resource control from the wireless device to the target node. In certain embodiments, the successful handover report may be included in a RRCRe-establishmentRequest message. In certain embodiments, performing one or more operations based on information in the successful handover report may comprise sending the successful handover report to a source node. In certain embodiments, performing one or more operations based on information in the successful handover report may comprise: indicating one or more issues associated with successful handover to a source node.

In certain embodiments, the network node may be a source node and the method may comprise receiving the successful handover report associated with the successful handover from a target node. In certain embodiments, performing one or more operations based on information in the successful handover report may comprise: identifying one or more near radio link failure cases to assess handover triggering conditions. In certain embodiments, performing one or more operations based on information in the successful handover report may comprise: determining whether a mobility configuration should be adjusted and changing the mobility configuration in response to determining that the mobility configuration should be adjusted. In certain embodiments, changing the mobility configuration may comprise changing one or more mobility thresholds between a source beam and/or cell and a target beam and/or cell. In certain embodiments, the method may further comprise sending a description of the changes to the mobility configuration to the target node to enable a coordinated change of mobility parameters. In certain embodiments, the method may further comprise sending the successful handover report from a gNB-CU at the source node to a gNB-DU at the source node to allow the gNB-DU to determine whether to perform one or more optimization actions. In certain embodiments, the one or more optimization actions may comprise one or more of: reconfiguring one or more beams with radio link monitoring issues; re-distributing one or more beams in terms of coverage; expanding coverage of one or more beams; and changing a number of beams serving an area.

In certain embodiments, the method may further comprise obtaining user data and forwarding the user data to a host computer or a wireless device.

Radio link monitoring (RLM) is a mechanism to identify and declare radio link failure in LTE and NR. In NR, for the RLM purpose, ideally the network would configure beams transmitted in all directions to be monitored by the UE and, the UE could either report the strongest or all of them so that the network could have full information about the UE perception in all possible directions. That is a costly exercise, however, especially in higher frequencies where the number of beams can grow significantly. Hence, only subset of all beams in a cell can be measured and reported by the UE.

In fact, one of the main differences in the NR RLM functionality, compared to LTE, is that the RLM functionality in LTE is described in the specifications so that the UE actions do not depend on parameters configured by the network. On the other hand, in NR, due to the wide range of frequencies and diversity of envisioned deployments and services, RLM is a quite configurable procedure. In NR, the network may configure the UE to perform RLM based on: i) different RS types (Synchronization Signal (SS)/Physical Broadcast Channel (PBCH) block and Channel State Information Reference Signal (CSI-RS)); ii) the exact resources to be monitored and the exact number to generate IS/OOS indications; and iii) the Block Error Rate (BLER) thresholds so that measured signal-to-interference-plus-noise ratio (SINR) values can be mapped to them to generate IS/OOS events to be indicated to the higher layers.

RLM in NR is performed based on up to 8 (preliminary) RLM reference signal (RS) resources configured by the network, where:

1. One RLM-RS resource can be either one Synchronization Signal (SS)/Physical Broadcast Channel (PBCH) block or one Channel State Information-Reference Signal (CSI-RS) resource/port,
2. The RLM-RS resources are UE-specifically configured at least in case of CSI-RS based RLM.
3. The RLM resources are configured on the control beams When the UE is configured to perform RLM on one or multiple RLM-RS resource(s):
1. Periodic IS is indicated if the estimated link quality corresponding to hypothetical Physical Downlink Control Channel (PDCCH) BLER based on at least Y=1 RLM-RS resource among all configured X RLM-RS resource(s) is above Q_in threshold; and
2. Periodic OOS is indicated if the estimated link quality corresponding to hypothetical PDCCH BLER based on all configured X RLM-RS resource(s) is below Q_out threshold.

Figure 4:
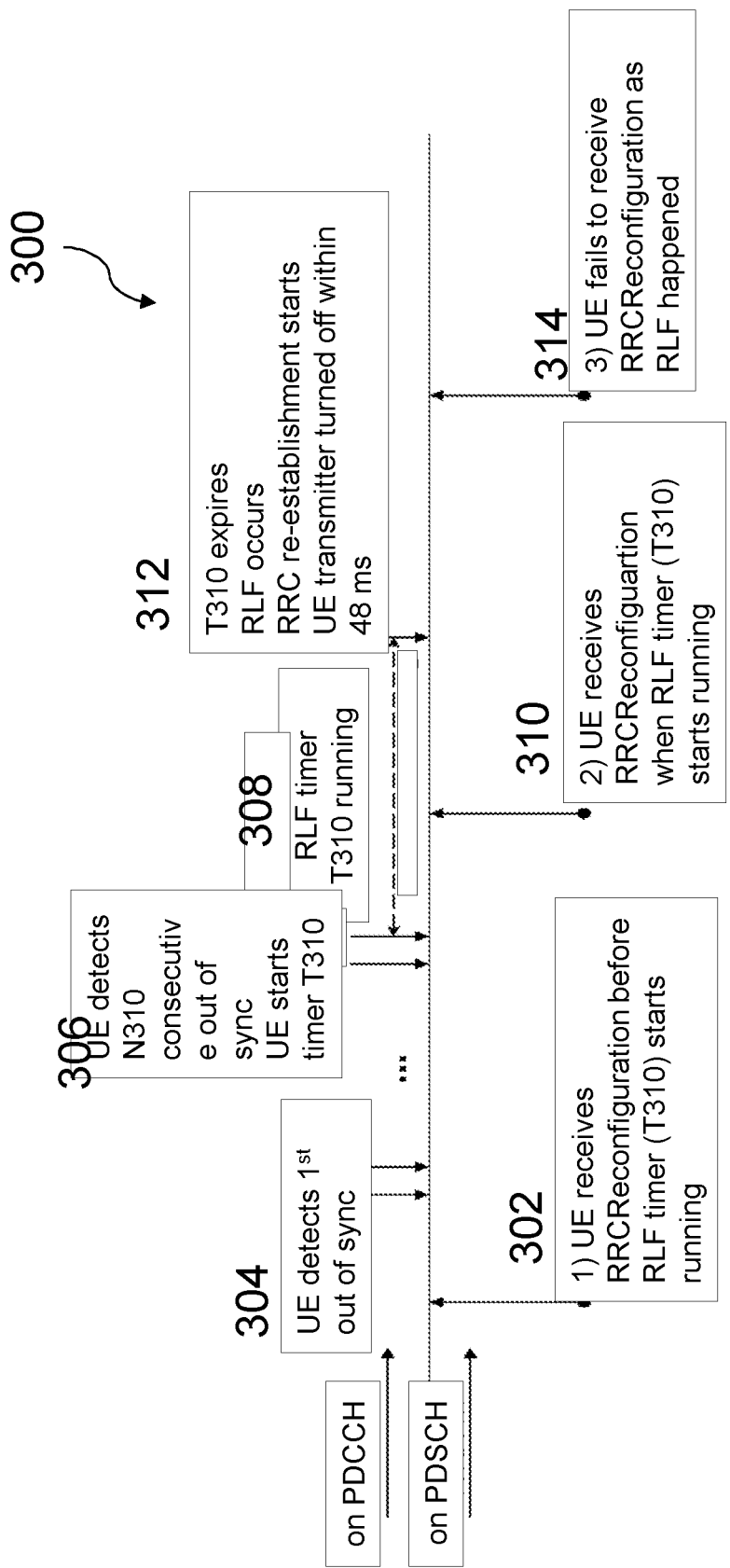
FIG. 4 illustrates a timeline depicting that a UE may receive RRCReconfiguration messages upon different conditions, according to certain embodiments.

FIG. 4 illustrates a timeline 300 depicting that a UE may receive RRCReconfiguration messages upon different conditions, according to certain embodiments. For example, at 302, the UE receives a RRCReconfiguration on PDSCH before the RLF timer (T310) starts running. At 304, the UE then detects on the PDCCH a first OOS trigger. At 306, observing N310 periodic OOS triggers a RLF timer that indicates the UE is in a near-RLF condition and that re-establishment procedure should start right after expiry of T310 timer.

At step 308, the RLF time (T310) continues running, and the UE receives a RRCReconfiguration message when the RLF timer (T310) starts running at 310. At step 312, the RLF timer (T310) expires and RLF occurs. The RRC re-establishment starts, and the UE transmitter is turned off within 48 ms. At step 314, the UE fails to receive RRCReconfiguration because the RLF happened.

Handover decisions are typically made based on radio condition measurements or radio condition predictions. However, for non-terrestrial networks, where the cells are associated to satellites, the handover decisions may be based on the device position in relation to the current and/or predicted satellite positions. One option is that the UE regularly provides its position information to the network. Another option is that the UE is configured with an event triggering condition based on its position, and when the UE position meets the triggering condition, the UE will send a report to the network. The UE may be configured with event triggering conditions that includes the ephemeris which includes the satellite position and orbit, which means that the triggering condition is evaluated in relation to the moving satellites. A similar situation arises when the UE is elevated and flying above the network infrastructure, where also a position-based handover triggering can be relevant.

In handover procedure, once the UE provides the measurement report to the network, the serving gNB requests for the handover to the target gNB via HandoverPreparationInformation and receives the handover command including the dedicated resources (including dedicated RACH-beam resources). Upon receiving the handover command, the serving gNB configures the MobilityControl in an RRCReconfiguration message and transmits to the UE to perform the handover to the target gNB. When transmitting the handover command to the UE, three different scenarios may occur, as shown in FIG. 4:
1) UE decodes the MobilityControl parameters and performs the handover to the target cell;
2) UE decodes the MobilityControl parameters and performs the handover to the target cell, while N310 times OOS event happened and T310 timer starts running;
3) UE fails to decode the MobilityControl parameters, as it is sent from network after RLF happening in UE.

Among the mentioned points above, case 1 is a normal condition where the UE is able to decode the RRCreconfiguration message. Case 3 indicates handover failure, and the RLF report will be produced to be reported after a successful RRC re-establishment procedure as explained in the previous section. However, case 2, which can be referred to as near-RLF condition, is not covered by the current state of handover related reports in the specification.

Figure 5:
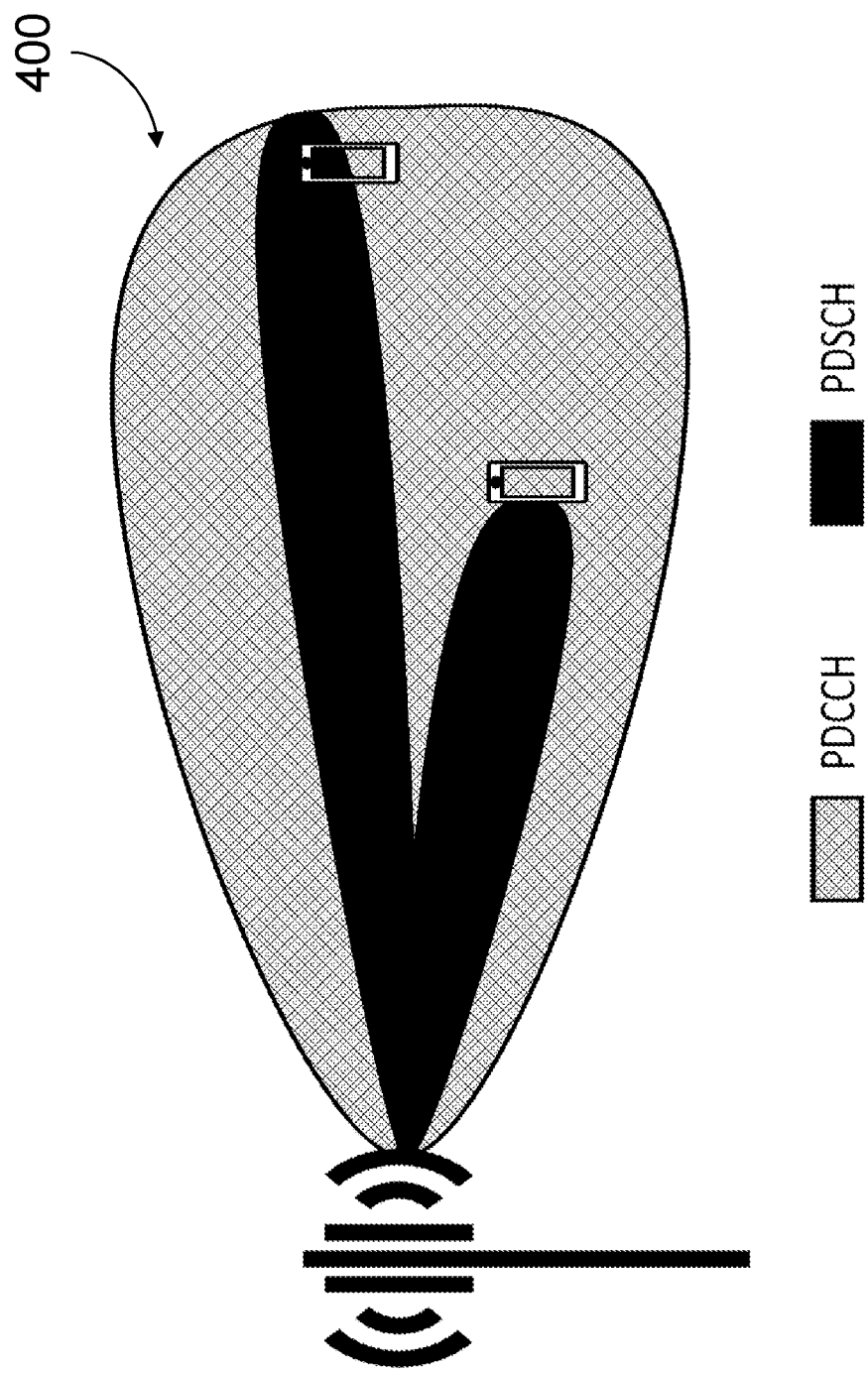
FIG. 5 illustrates the transmission of RLM resources over PDCCH using a wider beam compared to the RRCReconfiguration message transmitted over PDSCH using a narrower beam, according to certain embodiments.

Near-RLF condition concerns the cases where the UE monitors the radio link monitoring resources transmitted over PDCCH, while the RRCReconfiguration messages are received on Physical Downlink Shared Channel (PDSCH) and network leverage different beamforming at link beam to transmit RRCReconfiguration via PDSCH compared to the RLM resources which are transmitted over a usually wider beam via PDCCH. For example, FIG. 5 illustrates the transmission 400 of RLM resources over PDCCH using a wider beam compared to the RRCReconfiguration message transmitted over PDSCH using a narrower beam. Therefore, there might be a possibility that the UE is able to decode the RRCReconfiguration message (including the mobilityControl IE), while the measured RSRP values of RLM dedicated resources are lower than Q-out threshold leading to OOS indications and finally starts T310 timer.

Therefore, the mentioned near-RLF condition indicates that the UE is likely very close to RLF, and hence, it might be necessary for the source gNB to optimize the measurement report triggering thresholds (e.g., A3 event triggering threshold) in such a way that the UE receives the handover command including mobility control parameters in a proper time.

In certain embodiments, reporting the RLM (and or beam failure detection) related issues underneath of the handover procedure in a successful handover procedure is performed. This information can encompass several parameters including, for example, one or more (in some cases, all) the RLM related timers and/or the RLC retransmission counter. The mentioned parameters and required signaling are described in more detail below.

In certain embodiments, the Successful Handover Report signaled by the UE to the target RAN node and eventually signaled from the target RAN node to the source RAN node may also contain a RACH report providing information about RACH access performed by the UE at the time of accessing the target cell as part of the handover.

RACH information may advantageously allow the RAN nodes receiving it to deduce whether the beams the UE monitored and attempted to access via RACH procedures are the best beam for similar cases of mobility or whether those beams need to be chosen in a different way such as, for example, by differently configuring the UE.

In certain embodiments, the UE may report the above-described near-RLF information (e.g., including one or more (or all) RLF-related timers such as T310 timer and T312 timer) indicating that the UE is in near-RLF condition. This information can be useful for the source gNB to optimize the measurement report triggering events (e.g., A3 event) in such a way that the UE receives the mobility control parameters in a proper time. In certain embodiments, handover related timers (e.g., T304 timer) may be included to give the entire delay of the handover procedure.

In certain embodiments, the UE can include the RLC retransmission counter, which indicates there is an issue in uplink transmission, although the handover successfully happens before reaching the maximum RLC retransmission counter.

In certain embodiments, the UE can log the measurement related to the beam failure detection (BFD) procedure on the serving cell before receiving the handover command. In some cases, the same or even different resources (such as RLM resources) may be configured for BFD purpose. In certain embodiments, BFD indications (e.g., Qin and Qout indications) can be reported in successful handover if the value of the corresponding counters is greater than 0. Moreover, in certain embodiments the UE can report the measurement of the reference signals used for RLM or BFD purposes, for example in terms of RSRP, RSRQ, SINR, etc.

In certain embodiments, the UE may include the beam identities where RACH access was attempted. For example, in some cases the UE may include, for each RACH access attempted, the number of attempts made, which will give the RAN information about the transmission power used by the UE for each access. In certain embodiments, the UE may also provide an indication of the beam identity where RACH access succeeded.

In certain embodiments, the UE may include sensor captured data and measurements in the report. For example, the UE may include UE orientation/altitude and/or location, speed and heading (e.g., digital compass, gyroscope as well as barometer, etc.). In certain embodiments, the UE may include in the report its speed state (low, mid, high) that is usually counted for example as part of speed-based scaling procedure.

In certain embodiments, the UE may report the RSRP/RSRQ/SINR measurements of the configured reference signals at the time of successful handover. In certain embodiments, the UE may indicate whether the measurement report triggering condition that initiated the handover is still met or not. In certain embodiments, the UE may indicate whether the measurement report triggering condition has been met during the time window between when the measurement report was triggered and when the handover was successfully completed.

In certain embodiments, the UE may report the position information at the time of successful handover. The position information may be absolute or may be provided in relation to some triggering condition, and whether the triggering condition is still met or not, if it has been met during the time between when a measurement report was triggered. The triggering condition may include cell positions (for example, in case of non-terrestrial networks with cells associated to satellites), and/or predicted positions such as satellite orbits. A similar situation arises when the UE is elevated and flying above the network infrastructure, where also a position-based handover triggering can be relevant.

In certain embodiments, the successful handover report can be included in the Handover Complete message (RRCReconfigurationComplete) sent over RRC from the UE to the target RAN node.

In certain embodiments, the Handover Complete message can indicate the presence of a successful handover report (e.g., using a binary flag) and the network may fetch the successful handover report via any RRC procedure that enables retrieval of information from the UE (e.g., UEInformationRequest and UEInformationResponse procedure).

In certain embodiments, the measurement report may be included in the RRCRe-establishment Request message towards a re-establishment RAN node if any link failure happens before transmitting the successful handover.

In certain embodiments, the target node may indicate issues associated with successful handover (e.g., RLM issues) to the source node via a common interface such as the X2 or Xn. This may be done via a dedicated message or using currently standardized signaling messages. As one example, over the Xn interface the Handover report or RLF indication messages may be introduced and used to signal the information. Upon or in response to reception of a successful HO report, the receiving node is able to analyze whether its mobility configuration is optimal or if it needs adjustment. Such adjustments may result in changes of mobility configurations, such as changes of mobility thresholds between the source beam(s)/cell and the target beam (s)/cell. The RAN node applying mobility configuration changes as a consequence of receiving the HO report may signal a description of such changes to the target node in order to enable a coordinated change of mobility parameters, achieving benefits such as avoidance of ping pong effects. As one example, the source node receiving the Successful HO report and applying changes in the mobility thresholds applied to the target node cells or beams may communicate such changes in the mobility thresholds to the target node and it may suggest the target node to apply a similar, matching configuration (e.g., increase of threshold X at source by Y dB, decrease of threshold Z at target node, by −Y dB).

Since the gNB-DU is responsible for configuration of the beamforming, any decision on beam forming configuration may be made by gNB-DU at source node, or decisions made by gNB-CU may be sent to the gNB-DU when source node received a successful handover report from target node. This is considered in the following example embodiments.

In certain embodiments, the gNB-CU sends the successful handover report to the gNB-DU to allow the gNB-DU to take a decision on optimization actions such as reconfiguration of the beams with RLM issues. Similarly, in certain embodiments, the gNB-DU may take actions regarding the optimization of beam configuration as consequence of sub-optimal RACH access performance. Such actions may include, for example, re-distributing beams in terms of coverage, extending/expanding beams coverage, changing the number of beams serving one area. This decision can be taken whether per report basis, or by building statistics in a period of time and finding the optimal configuration (in average).

In certain embodiments, the gNB-CU can make decisions on the type of beam reconfiguration the gNB-DU should apply and send it to the gNB-DU. In some cases, this decision can be taken whether per report basis, or by building statistics in a period of time and finding the optimal configuration (in average). The gNB-CU may decide to signal to the gNB-DU a specific beams reconfiguration that addresses the issues detected by analyzing the successful handover report.

Alternatively, in certain embodiments the gNB-CU may send to the gNB-DU an indication of the issue encountered. For example, the gNB-CU may signal that the RLM list of beams for the specific UE needs updating and it may suggest beams to be added to it.

According to certain embodiments, the UE decides which information to be included in the measurement report to target upon handover.

In certain embodiments, the UE can flag for the network the successful handover report and include the RLF related timers if at least one of the RLF timers (e.g., T310 timer, T312 timer) is running but not expired.

In certain embodiments, the UE can flag for the network the successful handover report and include handover related timers (e.g., T304 timer) if such timers exceed a given threshold indicating long latency in the successful handover procedure.

According to certain embodiments, the source node can take advantage of the successful handover message. For example, given the information about the successful handovers, the source node can identify near RLF cases to assess handover triggering conditions. The near RLF cases may be classified as too early handover (e.g., problems associated to the target cell being too weak at the time of handover), too late handover (e.g., problems associated to the source cell being too weak at the time of handover) and handover to the wrong cell (e.g., problems associated to a different cell than the target cell was a better target cell alternative).

Certain embodiments provide selective reporting of measurement reports. For example, in certain embodiments, the UE may be configured with thresholds for RRC timers and measurement parameters which are eventually used by the UE to decide if it needs to send a measurement report after a successful handover. This would avoid unnecessary reporting from the UE, signaling overhead and impact of UE battery life.

In certain embodiments, the RAN node may be configured with thresholds instead of the UE to decide if the measurement report after a successful HO can be reported back to the source node.

In certain embodiments, the target RAN node may be configured to report the successful HO measurement report in case of a specific source RAT so prioritizing inter RAT scenarios since the likelihood of close handover is higher in inter system HO.

In certain embodiments, the target RAN node may be configured to report the successful HO measurement report in case of inter RAT handover scenario only.

In certain embodiments, the UE may be configured to report the successful HO measurements only when performing HO towards a specific target frequencies or inter frequency scenarios which includes but is not limited to configuration to report the measurements when performing a HO towards high frequencies or unlicensed frequency.

In certain embodiments, the thresholds configured on RAN node or UE may include (but are not limited to): thresholds for timer T310 and/or timer T312; thresholds for number of RLC retransmissions; and/or thresholds in dB or another unit for the relative strength RSRP, RSRQ of the alternate beams (e.g., only report if the alternate beam was x dB stronger than the configured beam).

Figure 6:
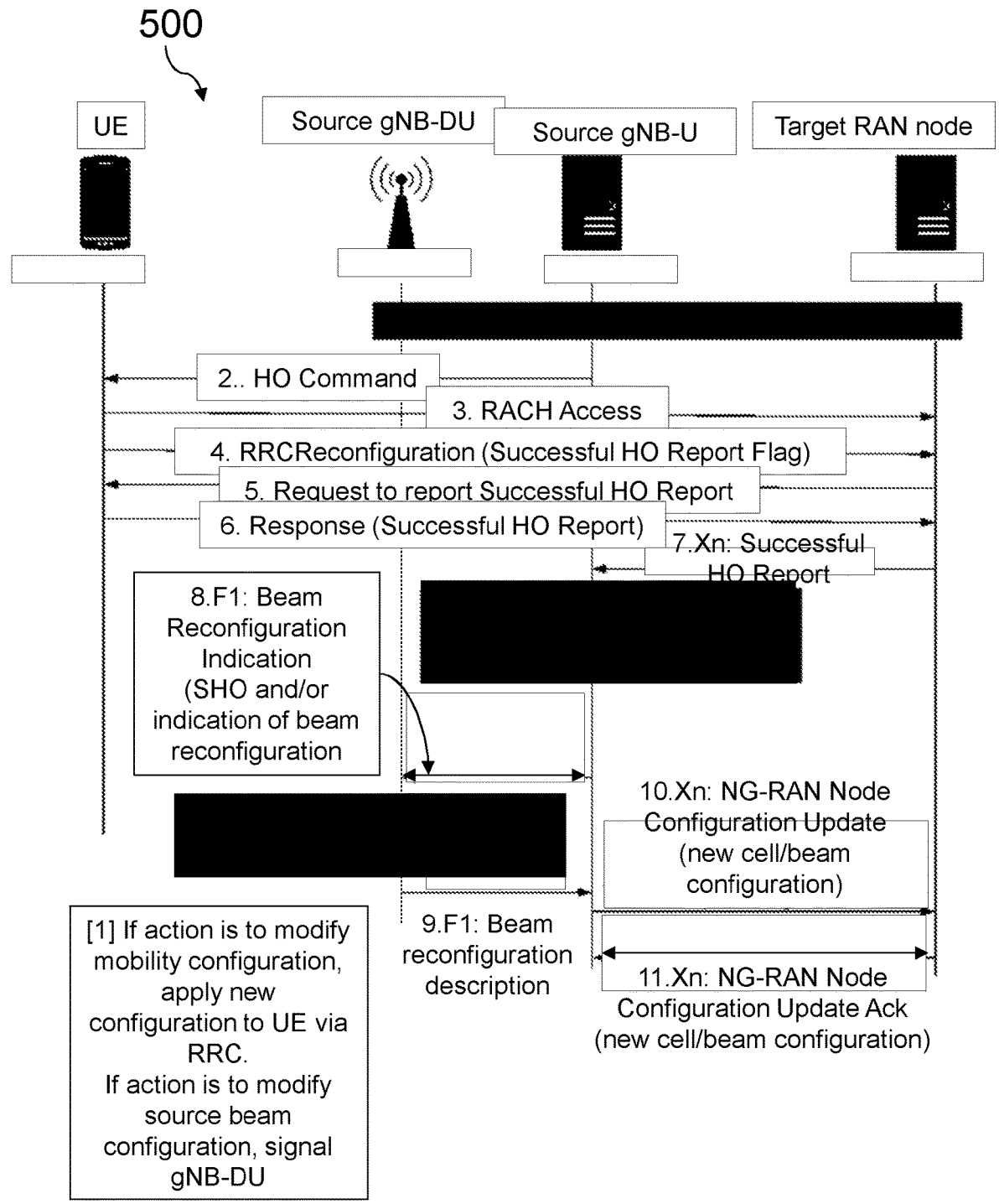
FIG. 6 illustrates an example message sequence chart for successful HO reporting and consequent actions, in accordance with certain embodiments.

FIG. 6 illustrates an example message sequence chart 500 for successful HO reporting and consequent actions, in accordance with certain embodiments. The steps depicted in FIG. 6 are described in more detail below:

Step 1: HO preparation procedures over, for example, Xn interface.
Step 2: HO command received by the UE.
Step 3: UE performs RACH access
Step 4: UE connects to target cell via RRC and it reports the availability of a Successful HO Report.
Step 5: RAN request UE to report Successful HO Report via RRC message.
Step 6: UE reports Successful HO Report via RRC message.
Step 7: Target RAN node forwards Successful HO Report to source node via, for example, the Xn interface. The gNB-CU or in general source RAN node analyses the HO Report and it deduces optimization actions either aimed at modifying mobility parameters configurations (these can be taken within the gNB-CU or RAN node without any further signaling) or aimed at modifying beam configurations (these need signaling with gNB-DU and eventually with neighbor RAN nodes).
Step 8: gNB-CU may signal to gNB DU over the F1 interface an indication of actions needed for reconfiguration of beams. For example, this could happen via signaling the successful HO report and/or signaling an indication of the beam reconfiguration (e.g., with beam configuration parameters) needed.
Step 9: gNB-DU replies with the beam reconfiguration applied.
Step 10: gNB CU signals the applied changes (at mobility and/or beam level) to the target RAN node.
Step 11: Target RAN node may modify its own mobility and beam configuration and signal back the applied new configuration.

Figure 7:
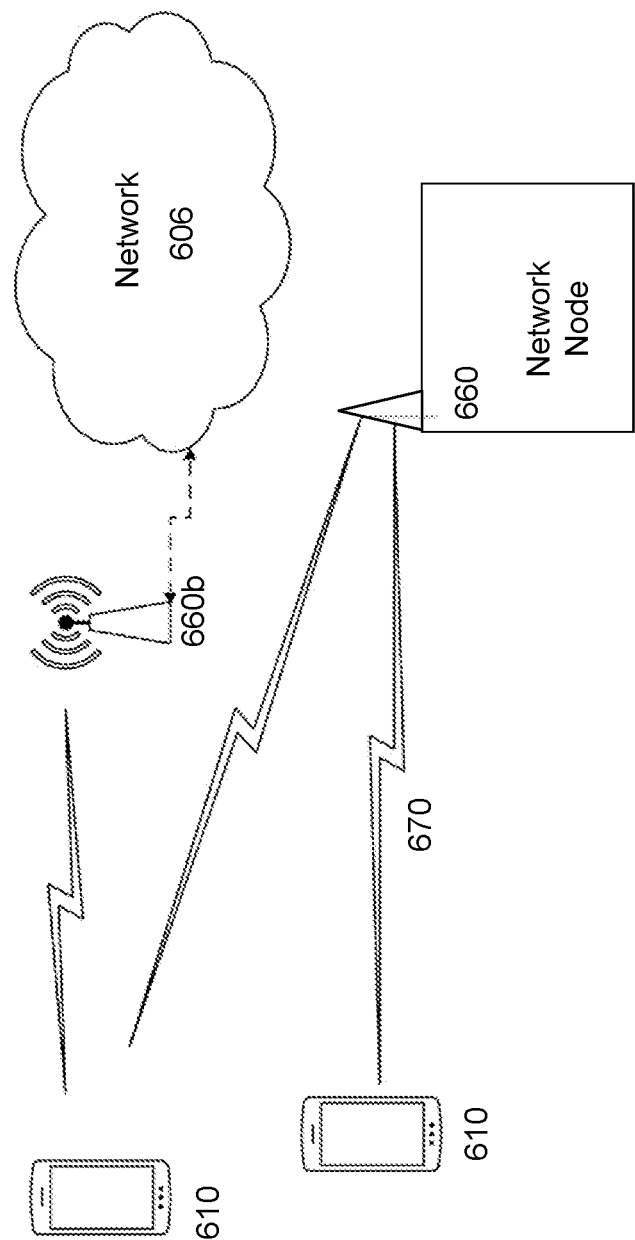
FIG. 7 illustrates an example wireless network, according to certain embodiments.

FIG. 7 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 606, network nodes 660 and 660b, and wireless devices 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and wireless device 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 8:
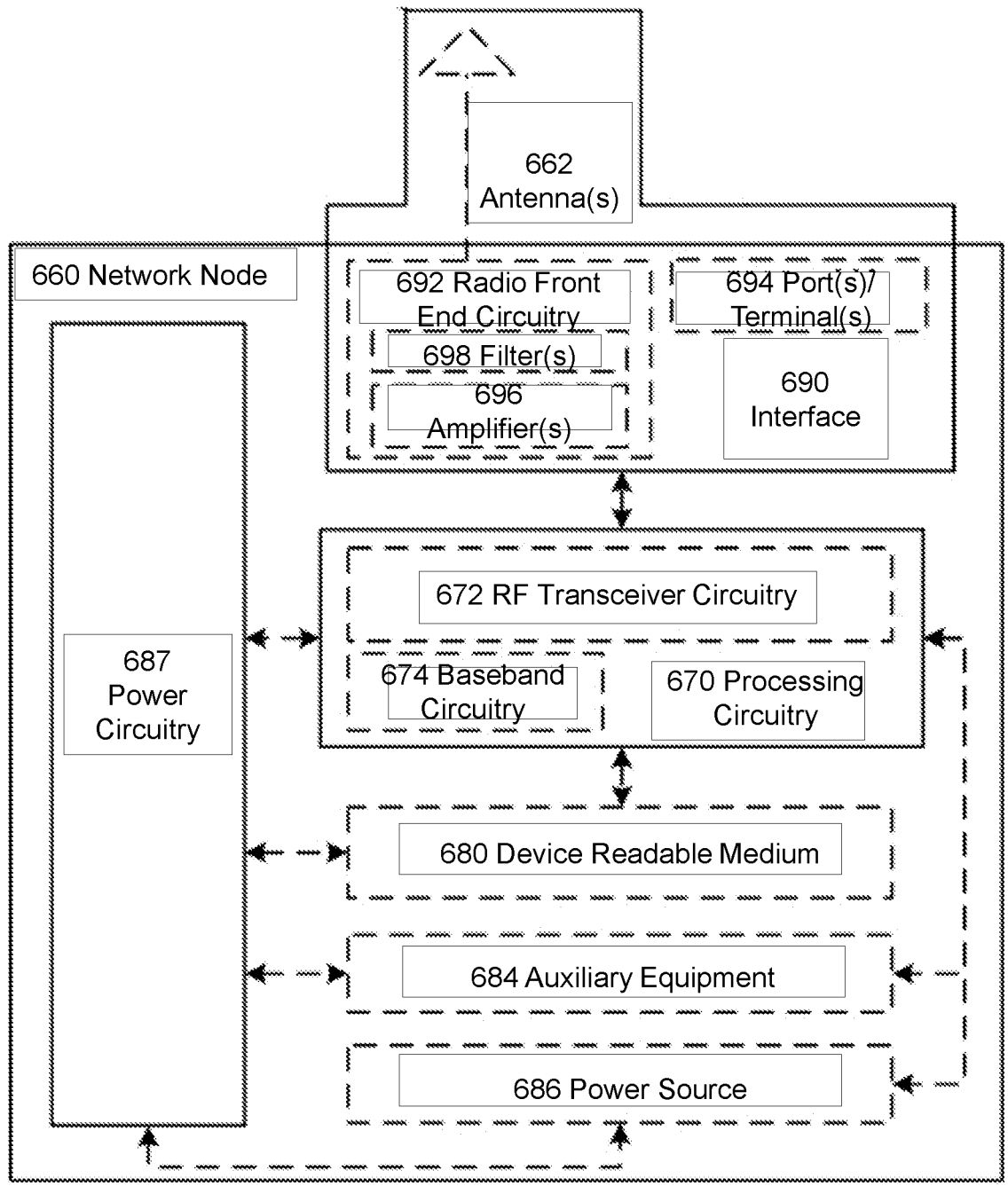
FIG. 8 illustrates an example network node, according to certain embodiments.

FIG. 8 illustrates an example network node 660, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 660 includes processing circuitry 670, device readable medium 680, interface 690, auxiliary equipment 684, power source 686, power circuitry 687, and antenna 662. Although network node 660 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or wireless devices 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or wireless devices via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 8 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

Figure 9:
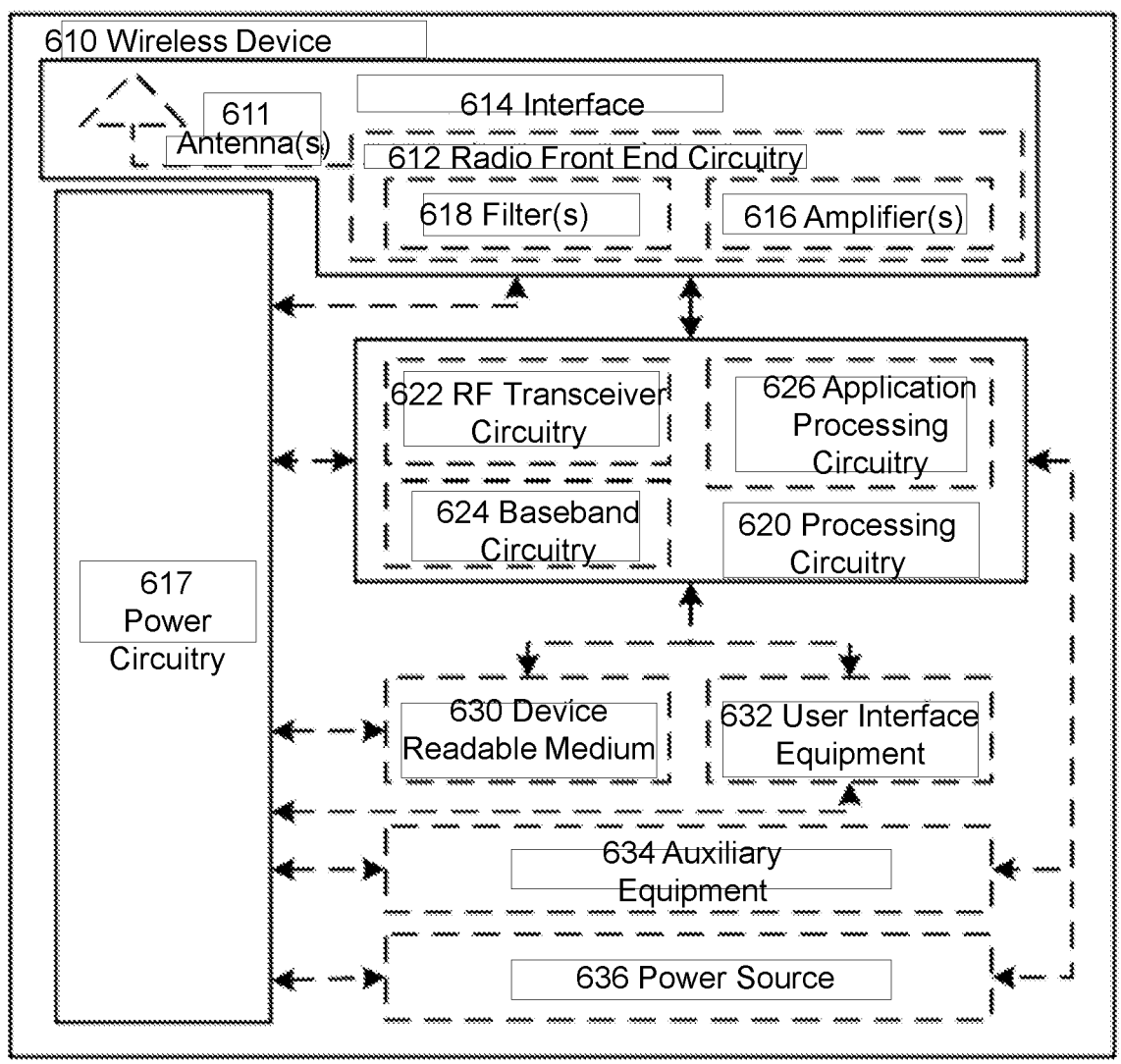
FIG. 9 illustrates an example wireless device, according to certain embodiments.

FIG. 9 illustrates an example wireless device 610, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. Wireless device 610 may include multiple sets of one or more of the illustrated components for different wireless technologies supported by wireless device 610, such as, for example, GSM, WCDMA, LTE, NR, WiFi, WiMAX, or Bluetooth wireless technologies, just to mention a few. These wireless technologies may be integrated into the same or different chips or set of chips as other components within wireless device 610.

Antenna 611 may include one or more antennas or antenna arrays, configured to send and/or receive wireless signals, and is connected to interface 614. In certain alternative embodiments, antenna 611 may be separate from wireless device 610 and be connectable to wireless device 610 through an interface or port. Antenna 611, interface 614, and/or processing circuitry 620 may be configured to perform any receiving or transmitting operations described herein as being performed by a wireless device. Any information, data and/or signals may be received from a network node and/or another wireless device. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, wireless device 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or wireless devices via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 610 components, such as device readable medium 630, wireless device 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of wireless device 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a wireless device may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of wireless device 610, but are enjoyed by wireless device 610 as a whole, and/or by end users and the wireless network generally.

Processing circuitry 620 may be configured to perform any determining, calculating, or similar operations (e.g., certain obtaining operations) described herein as being performed by a wireless device. These operations, as performed by processing circuitry 620, may include processing information obtained by processing circuitry 620 by, for example, converting the obtained information into other information, comparing the obtained information or converted information to information stored by wireless device 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with wireless device 610. Such interaction may be of many forms, such as visual, audial, tactile, etc. User interface equipment 632 may be operable to produce output to the user and to allow the user to provide input to wireless device 610. The type of interaction may vary depending on the type of user interface equipment 632 installed in wireless device 610. For example, if wireless device 610 is a smart phone, the interaction may be via a touch screen; if wireless device 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into wireless device 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from wireless device 610, and to allow processing circuitry 620 to output information from wireless device 610. User interface equipment 632 may include, for example, a speaker, a display, vibrating circuitry, a USB port, a headphone interface, or other output circuitry. Using one or more input and output interfaces, devices, and circuits, of user interface equipment 632, wireless device 610 may communicate with end users and/or the wireless network, and allow them to benefit from the functionality described herein.

Auxiliary equipment 634 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. Wireless device 610 may further comprise power circuitry 637 for delivering power from power source 636 to the various parts of wireless device 610 which need power from power source 636 to carry out any functionality described or indicated herein. Power circuitry 637 may in certain embodiments comprise power management circuitry. Power circuitry 637 may additionally or alternatively be operable to receive power from an external power source; in which case wireless device 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of wireless device 610 to which power is supplied.

Figure 10:
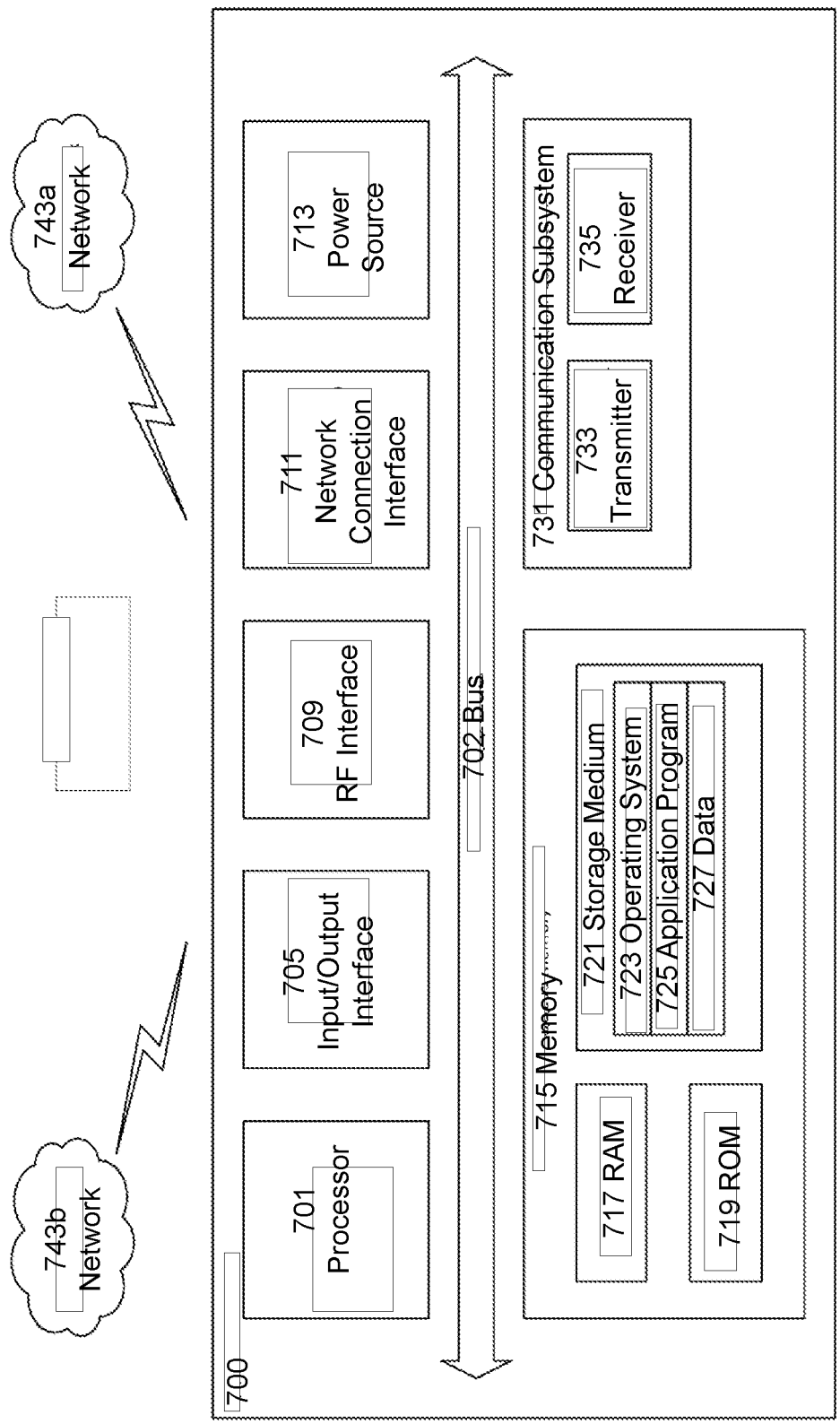
FIG. 10 illustrate an example user equipment, according to certain embodiments.

FIG. 10 illustrates one embodiment of a UE 700 in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 700 may be any UE identified by the 3$^{rd}$ Generation Partnership Project (3GPP), including a NB-IoT UE, a machine type communication (MTC) UE, and/or an enhanced MTC (eMTC) UE. UE 700, as illustrated in FIG. 10, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 10 is a UE, the components discussed herein are equally applicable to a wireless device, and vice-versa.

In FIG. 10, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 10, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another wireless device, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 11:
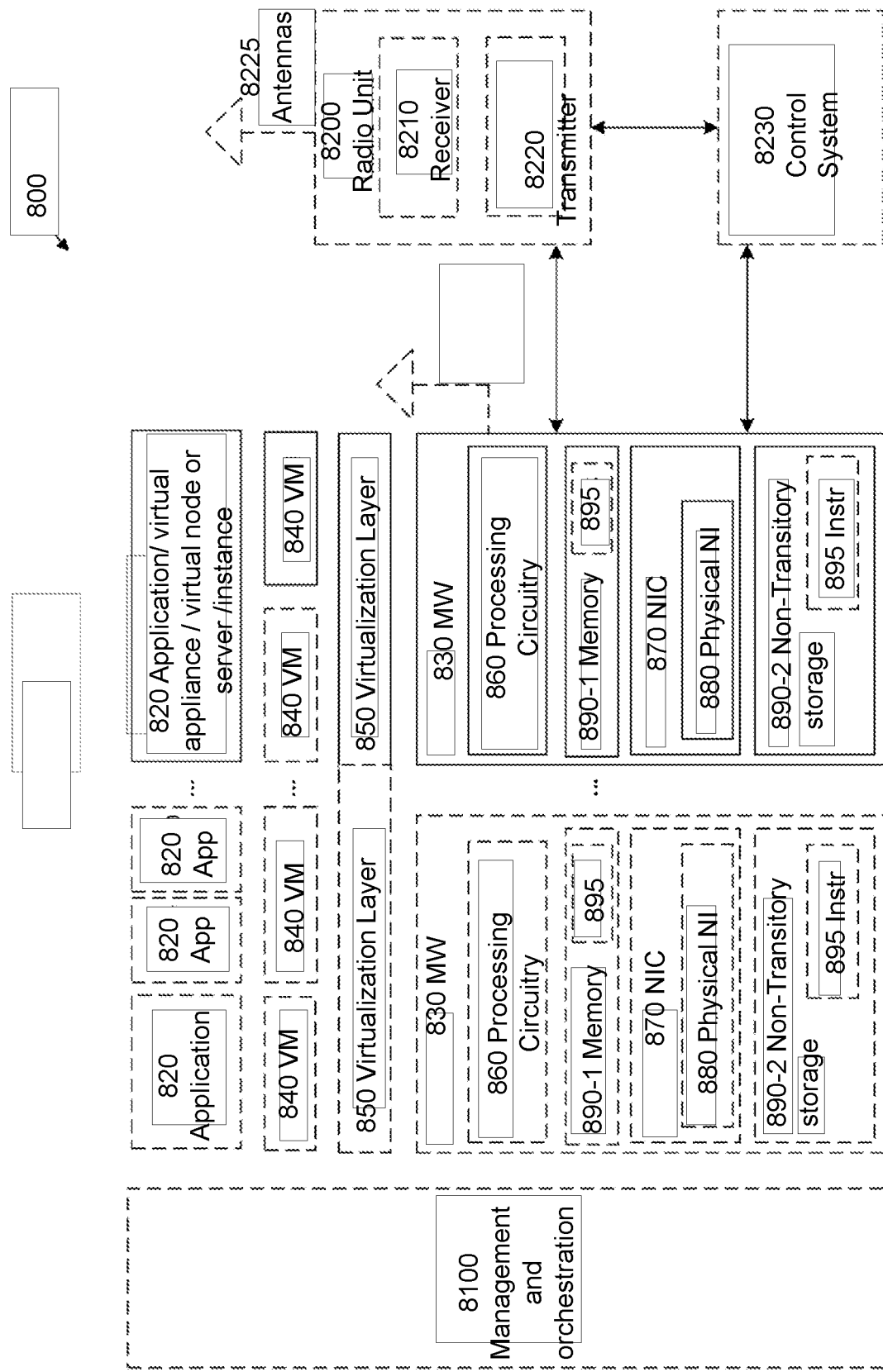
FIG. 11 illustrates a virtualization environment in which functions implemented by some embodiments may be virtualized, according to certain embodiments.

FIG. 11 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 11, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 11.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 12:
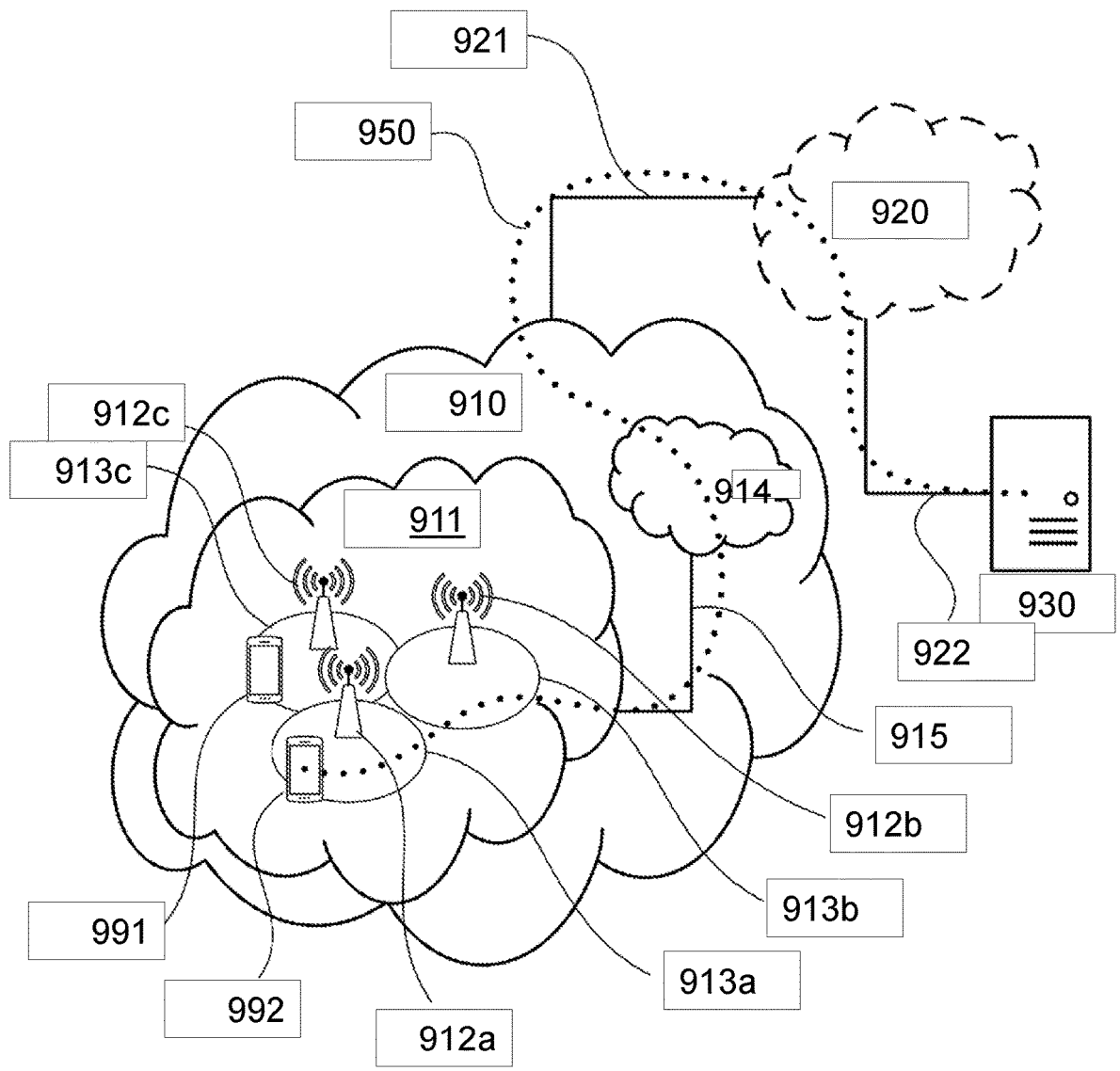
FIG. 12 illustrates a telecommunication network connected via an intermediate network to a host computer, according to certain embodiments.

With reference to FIG. 12, in accordance with an embodiment, a communication system includes telecommunication network 910, such as a 3GPP-type cellular network, which comprises access network 911, such as a radio access network, and core network 914. Access network 911 comprises a plurality of base stations 912*a*, 912*b*, 912*c*, such as NBs, eNBs, gNBs or other types of wireless access points, each defining a corresponding coverage area 913*a*, 913*b*, 913*c*. Each base station 912*a*, 912*b*, 912*c* is connectable to core network 914 over a wired or wireless connection 915. A first UE 991 located in coverage area 913*c* is configured to wirelessly connect to, or be paged by, the corresponding base station 912*c*. A second UE 992 in coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more subnetworks (not shown).

The communication system of FIG. 12 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Figure 13:
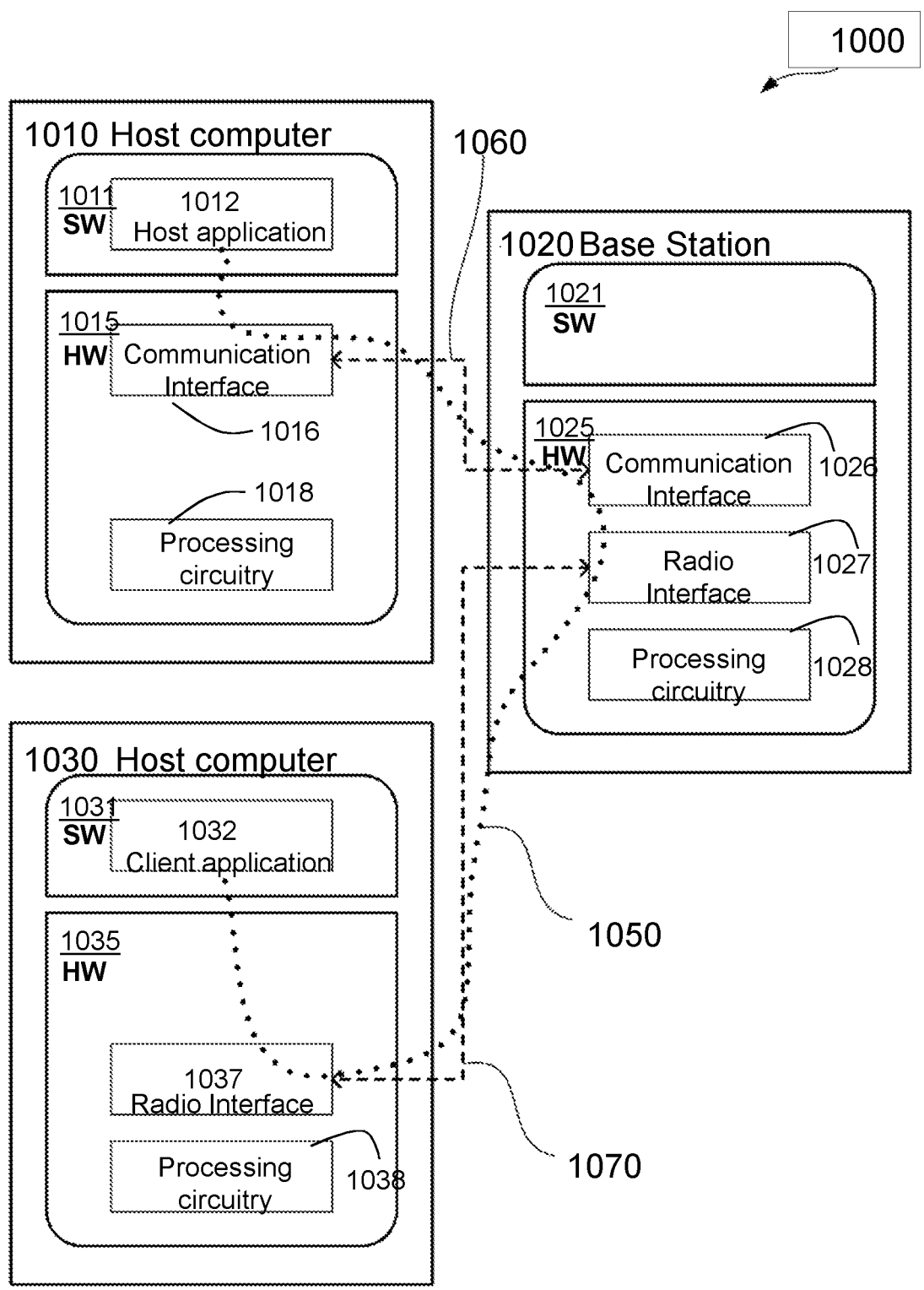
FIG. 13 illustrates a generalized block diagram of a host computer communicating via a base station with a user equipment over a partially wireless connection, according to certain embodiments.

FIG. 13 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 13. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 13) served by base station 1020. Communication interface 1026 may be configured to facilitate connection 1060 to host computer 1010. Connection 1060 may be direct or it may pass through a core network (not shown in FIG. 13) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 13 may be similar or identical to host computer 930, one of base stations 912a, 912b, 912c and one of UEs 991, 992 of FIG. 12, respectively. This is to say, the inner workings of these entities may be as shown in FIG. 13 and independently, the surrounding network topology may be that of FIG. 12.

In FIG. 13, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figures 16, 17:
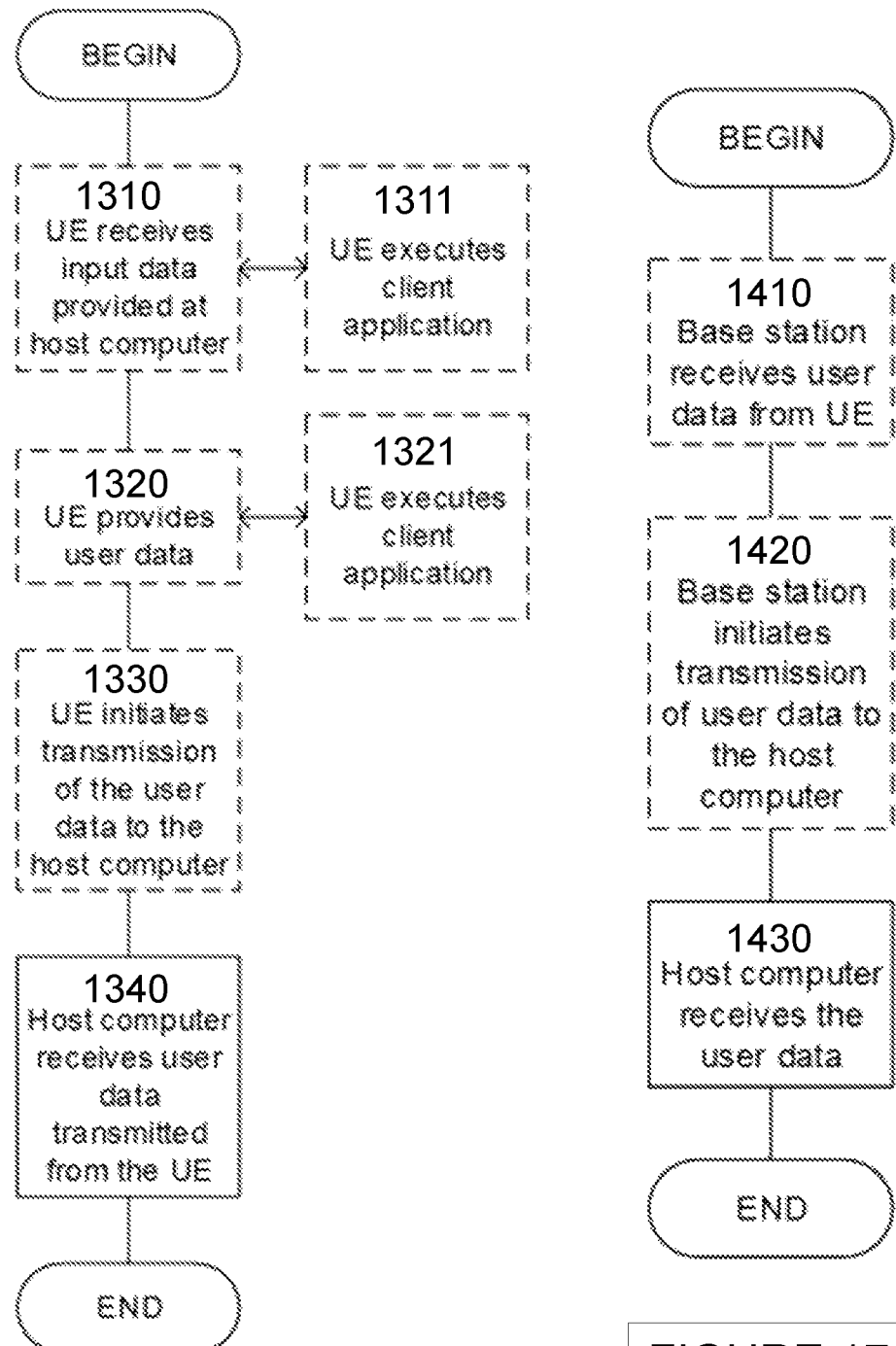
FIG. 16 illustrates another method implemented in a communication system, according to one embodiment.
FIG. 17 illustrates another method implemented in a communication system, according to one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in sub step 1330 (which may be optional), transmission of the user data to the host computer. In step 1340 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Figure 18:
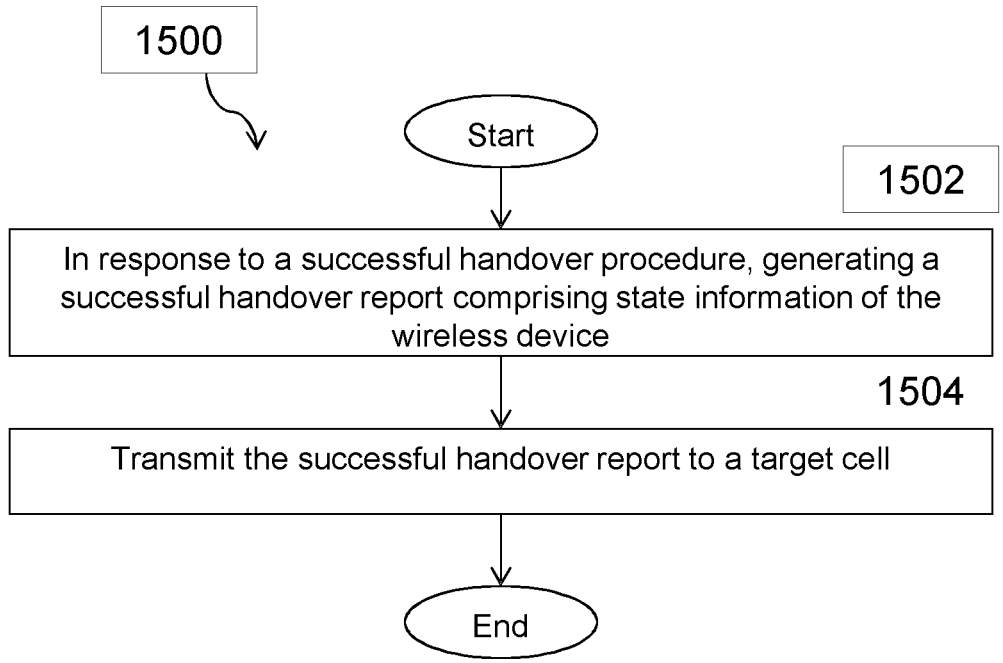
FIG. 18 illustrates an example method by a wireless device, according to certain embodiments.

FIG. 18 is a flow chart of a method 1500 in a wireless device, in accordance with particular embodiments. The method begins at step 1502, where the wireless device, in response to a successful handover procedure, generates a successful handover report comprising state information of the wireless device.

In certain embodiments, the method may further comprise receiving a configuration for the successful handover report. In certain embodiments, the method may further comprise determining whether a successful handover report trigger condition has been met.

In certain embodiments, the successful handover report may comprise information related to a source cell or the target cell. In certain embodiments, the successful handover report may comprise information indicating that the wireless device is in near-RLF condition. In certain embodiments, the successful handover report may comprise information about one or more radio link monitoring-related timers. In certain embodiments, the successful handover report may comprise information about a radio link control retransmission counter.

In certain embodiments, the method may further comprise logging one or more measurements related to a beam failure detection procedure on a serving cell.

In certain embodiments, the successful handover report may comprise one or more of: one or more beam identities for which random access channel access was attempted; and for each beam identity, a number of random access channel access attempts. In certain embodiments, the successful handover report may comprise one or more of: sensor captured data or measurements; and a speed state of the wireless device.

In certain embodiments, the successful handover report may comprise one or more of: one or more reference signal received power measurements for configured reference signals at the time of successful handover; one or more reference signal received quality measurements for configured reference signals at the time of successful handover; and one or more signal-to-interference-plus-noise ratio measurements for configured reference signals at the time of successful handover.

In certain embodiments, the successful handover report may comprise position information at the time of successful handover.

At step 1504, the wireless device transmits the successful handover report to a target cell. In certain embodiments, the method may further comprise receiving a request for the successful handover report from the target cell. In certain embodiments, the successful handover report may be transmitted to the target cell in response to the received request.

In certain embodiments, the successful handover report may be included in a Handover Complete message (RRCReconfigurationComplete) sent over radio resource control from the wireless device to the target cell.

In certain embodiments, the method may further comprise indicating presence of successful handover report to the network using a binary flag.

In certain embodiments, the successful handover report may be included in a RRCRe-establishmentRequest message.

In certain embodiments, the method may further comprise providing user data and forwarding the user data to a host computer via the transmission to the base station.

Figure 19:
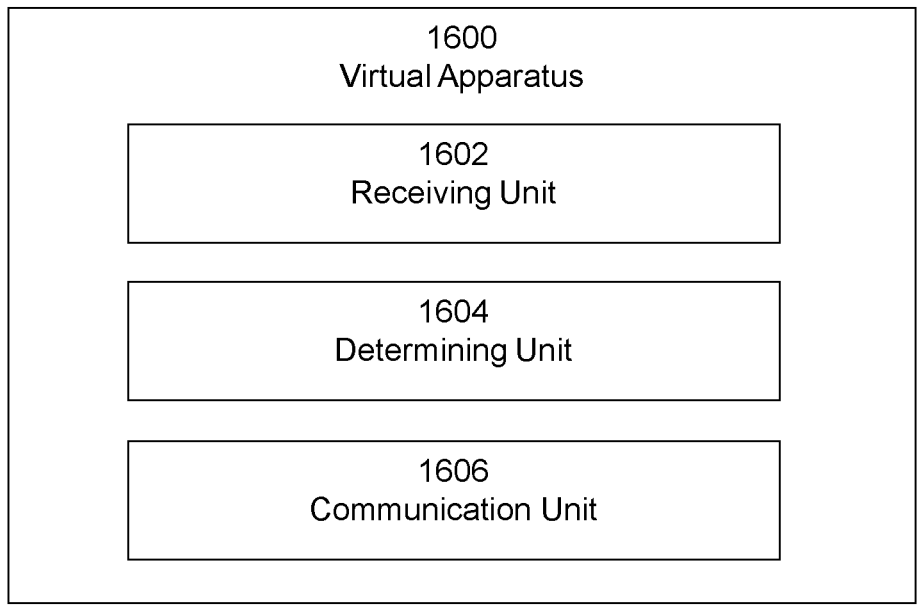
FIG. 19 illustrates an exemplary virtual computing device, according to certain embodiments.

FIG. 19 illustrates a schematic block diagram of an apparatus 1600 in a wireless network (for example, the wireless network shown in FIG. 7). The apparatus may be implemented in a wireless device (e.g., wireless device 110 shown in FIG. 7). Apparatus 1600 is operable to carry out the example method described with reference to FIG. 18 and possibly any other processes or methods disclosed herein. It is also to be understood that the method of FIG. 18 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1602, determining unit 1604, communication unit 1606, and any other suitable units of apparatus 1600 to perform corresponding functions according one or more embodiments of the present disclosure.

In certain embodiments, apparatus 1600 may be a UE. As illustrated in FIG. 19, apparatus 1600 includes receiving unit 1602, determining unit 1604, and communication unit 1606. Receiving unit 1602 may be configured to perform the receiving functions of apparatus 1600. For example, receiving unit 1602 may be configured to receive a configuration for the successful handover report. As another example, receiving unit 1602 may be configured to receive a request for the successful handover report from the target cell.

Receiving unit 1602 may receive any suitable information (e.g., from a wireless device or another network node). Receiving unit 1602 may include a receiver and/or a transceiver, such as RF transceiver circuitry 122 described above in relation to FIG. 7. Receiving unit 1602 may include circuitry configured to receive messages and/or signals (wireless or wired). In particular embodiments, receiving unit 1602 may communicate received messages and/or signals to determining unit 1604 and/or any other suitable unit of apparatus 1600. The functions of receiving unit 1602 may, in certain embodiments, be performed in one or more distinct units.

Determining unit 1604 may perform the processing functions of apparatus 1600. For example, determining unit 1604 may be configured to, in response to a successful handover procedure, generate a successful handover report comprising state information of the wireless device. As another example, determining unit 1604 may be configured to determine whether a successful handover report trigger condition has been met. As still another example, determining unit 1604 may be configured to log one or more measurements related to a beam failure detection procedure on a serving cell. As yet another example, determining unit 1604 may be configured to indicate presence of successful handover report to the network using a binary flag. As another example, determining unit 1604 may be configured to provide user data.

Determining unit 1604 may include or be included in one or more processors, such as processing circuitry 120 described above in relation to FIG. 7. Determining unit 1604 may include analog and/or digital circuitry configured to perform any of the functions of determining unit 1604 and/or processing circuitry 120 described above. The functions of determining unit 1604 may, in certain embodiments, be performed in one or more distinct units.

Communication unit 1606 may be configured to perform the transmission functions of apparatus 1600. For example, communication unit 1606 may be configured to transmit the successful handover report to a target cell. As another example, communication unit 1606 may be configured to forward the user data to a host computer via the transmission to the base station Communication unit 1606 may transmit messages (e.g., to a wireless device and/or another network node). Communication unit 1606 may include a transmitter and/or a transceiver, such as RF transceiver circuitry 122 described above in relation to FIG. 7. Communication unit 1606 may include circuitry configured to transmit messages and/or signals (e.g., through wireless or wired means). In particular embodiments, communication unit 1606 may receive messages and/or signals for transmission from determining unit 1604 or any other unit of apparatus 1600. The functions of communication unit 1604 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
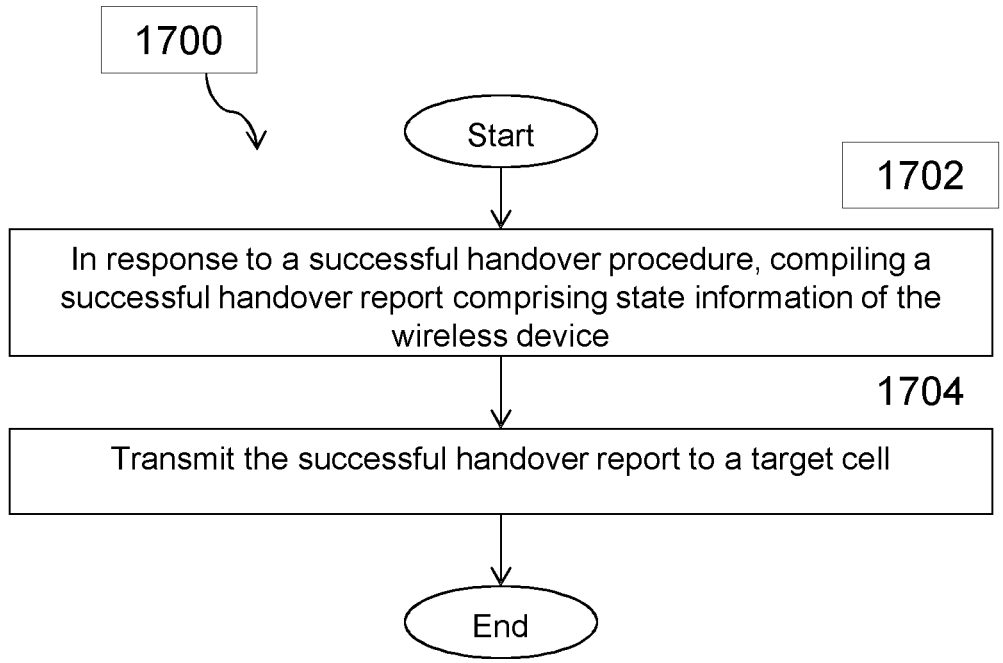
FIG. 20 illustrates another example method by a wireless device, according to certain embodiments.

FIG. 20 is a flow chart of a method 1700 performed by a wireless device 610, in accordance with particular embodiments. The method begins at step 1702 when, in response to a successful handover procedure, the wireless device 610 compiles a successful handover report comprising state information of the wireless device. At step 1704, the wireless device 610 transmits the successful handover report to a target cell.

In a particular embodiment, the wireless device 610 receives a configuration for the successful handover report. The configuration includes at least one successful handover triggering condition.

In a particular embodiment, the wireless device 610 determines whether at least one successful handover report trigger condition has been met.

In a particular embodiment, the wireless device 610 receives a request for the successful handover report from the target cell. The successful handover report is transmitted to the target cell in response to the received request.

In a particular embodiment, the successful handover report includes information related to at least one of a source cell and the target cell.

In a particular embodiment, the successful handover report includes information indicating that the wireless device is in near-RLF condition. As used herein, a near-RLF condition means the timer is running but is near expiring, whereas a RLF condition means the timer has expired before a successful handover can be performed.

In a particular embodiment, the successful handover report includes information about one or more RLM-related timers. In particular embodiments, the RLM-related timers may include T310 and/or T312 timers.

In a particular embodiment, the successful handover report includes information about one or more mobility related timers.

In a particular embodiment, the successful handover report includes information about a radio link control retransmission counter. This counter indicates a near RLF condition. In a particular embodiment, the successful handover report may include information indicating a number of retransmissions performed by the UE when performing the successful handover.

In a particular embodiment, wireless device 610 logs one or more measurements related to one or more beams configured for a beam failure detection procedure on a source cell.

In a particular embodiment, the successful handover report includes information about beam failure detection counters.

In a particular embodiment, the successful handover report includes one or more of: one or more beam identities for which random access channel access was attempted; for each beam identity, a number of random access channel access attempts; sensor captured data or measurements; a speed state of the wireless device; and position information associated with the wireless device at the time of successful handover.

In a particular embodiment, the successful handover report includes one or more of: one or more reference signal received power measurements for configured reference signals for beam failure detection or radio link failure monitoring or beam failure recovery procedures at the time of successful handover; one or more reference signal received quality measurements for configured reference signals for beam failure detection or radio link failure monitoring or beam failure recovery procedures at the time of successful handover; and one or more signal-to-interference-plus-noise ratio measurements for configured reference signals for beam failure detection or radio link failure monitoring or beam failure recovery procedures at the time of successful handover.

In a particular embodiment, the successful handover report is included in a Handover Complete message (RRCReconfigurationComplete) sent over radio resource control from the wireless device to the target cell.

In a particular embodiment, wireless device 610 indicates presence of successful handover report to the network using a binary flag.

In a particular embodiment, the successful handover report is included in a RRCRe-establishmentRequest message.

Figure 21:
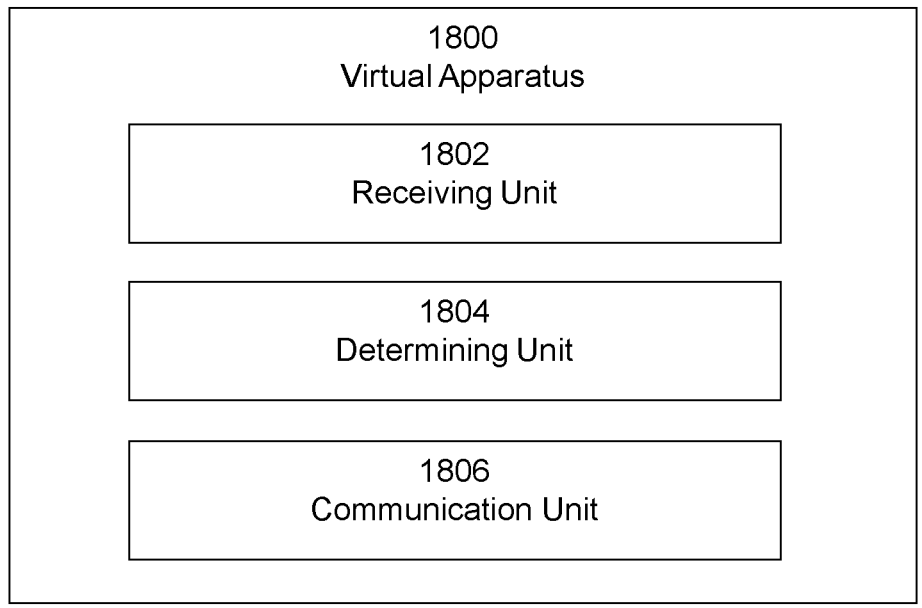
FIG. 21 illustrates another exemplary virtual computing device, according to certain embodiments.

FIG. 21 illustrates a schematic block diagram of an apparatus 1800 in a wireless network (for example, the wireless network shown in FIG. 7). The apparatus may be implemented in a wireless device (e.g., wireless device 110 shown in FIG. 7). Apparatus 1800 is operable to carry out the example method described with reference to FIG. 20 and possibly any other processes or methods disclosed herein. It is also to be understood that the method of FIG. 20 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1802, determining unit 1804, communication unit 1806, and any other suitable units of apparatus 1800 to perform corresponding functions according one or more embodiments of the present disclosure.

In certain embodiments, apparatus 1800 may be a UE. As illustrated in FIG. 21, apparatus 1800 includes receiving unit 1802, determining unit 1804, and communication unit 1806. Receiving unit 1802 may be configured to perform the receiving functions of apparatus 1800. For example, receiving unit 1802 may be configured to receive a configuration for the successful handover report. As another example, receiving unit 1802 may be configured to receive a request for the successful handover report from the target cell.

Receiving unit 1802 may receive any suitable information (e.g., from a wireless device or another network node). Receiving unit 1802 may include a receiver and/or a transceiver, such as RF transceiver circuitry 622 described above in relation to FIG. 9. Receiving unit 1802 may include circuitry configured to receive messages and/or signals (wireless or wired). In particular embodiments, receiving unit 1802 may communicate received messages and/or signals to determining unit 1804 and/or any other suitable unit of apparatus 1800. The functions of receiving unit 1802 may, in certain embodiments, be performed in one or more distinct units.

Determining unit 1804 may perform the processing functions of apparatus 1800. For example, determining unit 1804 may be configured to, in response to a successful handover procedure, compile a successful handover report comprising state information of the wireless device.

Determining unit 1804 may include or be included in one or more processors, such as processing circuitry 620 described above in relation to FIG. 9. Determining unit 1804 may include analog and/or digital circuitry configured to perform any of the functions of determining unit 1804 and/or processing circuitry 620 described above. The functions of determining unit 1804 may, in certain embodiments, be performed in one or more distinct units.

Communication unit 1806 may be configured to perform the transmission functions of apparatus 1800. For example, communication unit 1806 may be configured to transmit the successful handover report to a target cell. As another example, communication unit 1806 may be configured to forward the user data to a host computer via the transmission to the base station Communication unit 1806 may transmit messages (e.g., to a wireless device and/or another network node). Communication unit 1806 may include a transmitter and/or a transceiver, such as RF transceiver circuitry 622 described above in relation to FIG. 9. Communication unit 1806 may include circuitry configured to transmit messages and/or signals (e.g., through wireless or wired means). In particular embodiments, communication unit 1806 may receive messages and/or signals for transmission from determining unit 1804 or any other unit of apparatus 1800. The functions of communication unit 1804 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 22:
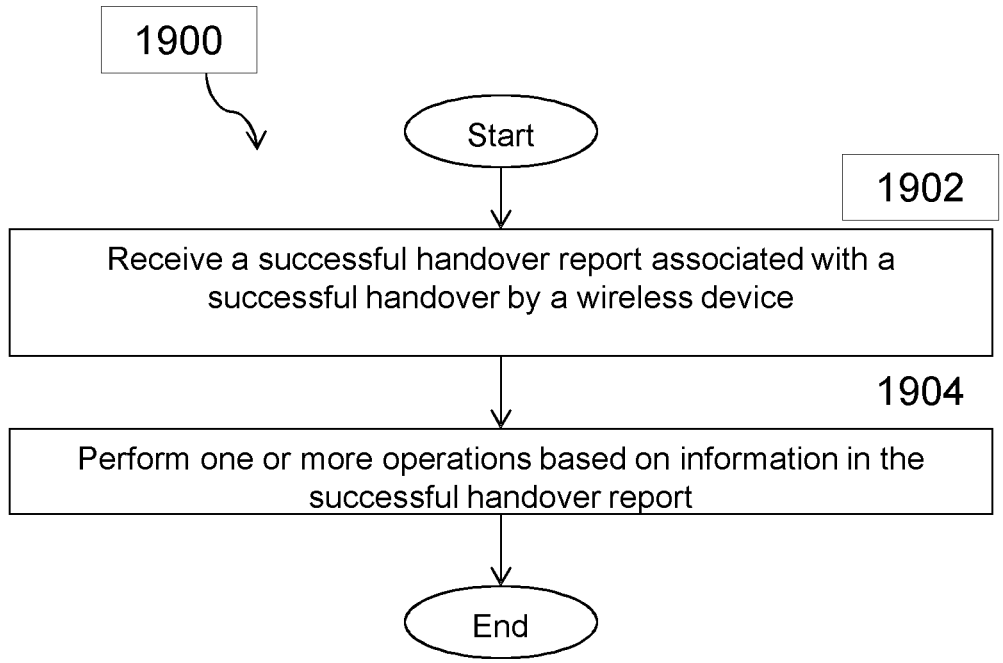
FIG. 22 illustrates an example method by a network node, according to certain embodiments.

FIG. 22 is a flow chart of a method in a network node, in accordance with particular embodiments. The method begins at step 1902, where the network node receives a successful handover report associated with a successful handover by a wireless device.

In certain embodiments, the successful handover report may comprise information related to a source cell and/or a target cell. In certain embodiments, the successful handover report may comprise information indicating that the wireless device is in near-RLF condition. In certain embodiments, the successful handover report may comprise information about one or more radio link monitoring-related timers. In certain embodiments, the successful handover report comprises information about one or more mobility related timers. In certain embodiments, the successful handover report may comprise information about a radio link control retransmission counter.

In certain embodiments, the successful handover report may comprise one or more measurements related to one or more beams configured for a beam failure detection procedure. In certain embodiments, the successful handover report may comprise one or more of: one or more beam identities for which random access channel access was attempted; and for each beam identity, a number of random access channel access attempts.

In certain embodiments, the successful handover report may comprise one or more of: one or more beam identities for which random access channel access was attempted; for each beam identity, a number of random access channel access attempts; sensor captured data or measurements; a speed state of the wireless device; and position information associated with the wireless device at the time of successful handover. In certain embodiments, the successful handover report may comprise one or more of: one or more reference signal received power measurements for configured reference signals for beam failure detection or radio link failure monitoring or beam failure recovery procedures at the time of successful handover; one or more reference signal received quality measurements for configured reference signals for beam failure detection or radio link failure monitoring or beam failure recovery procedures at the time of successful handover; and one or more signal-to-interference-plus-noise ratio measurements for configured reference signals for beam failure detection or radio link failure monitoring or beam failure recovery procedures at the time of successful handover. In certain embodiments, the successful handover report may comprise position information at the time of successful handover.

At step 1904, the network node performs one or more operations based on information in the successful handover report.

In certain embodiments, the network node may be a target node, and the method may comprise receiving the successful handover report associated with the successful handover from the wireless device. In certain embodiments, the method may further comprise sending a request for the successful handover report to the wireless device. In certain embodiments, the successful handover report may be received in response to the request. In certain embodiments, the successful handover report may be included in a Handover Complete message (RRCReconfigurationComplete) sent over radio resource control from the wireless device to the target node. In certain embodiments, the successful handover report may be included in a RRCRe-establishmentRequest message. In certain embodiments, performing one or more operations based on information in the successful handover report may comprise sending the successful handover report to a source node. In certain embodiments, performing one or more operations based on information in the successful handover report may comprise: indicating one or more issues associated with successful handover to a source node.

In certain embodiments, the network node may be a source node, and the method may comprise receiving the successful handover report associated with the successful handover from a target node. In certain embodiments, performing one or more operations based on information in the successful handover report may comprise: identifying one or more near radio link failure cases to assess handover triggering conditions. In certain embodiments, performing one or more operations based on information in the successful handover report may comprise: determining whether a mobility configuration should be adjusted; and changing the mobility configuration in response to determining that the mobility configuration should be adjusted. In certain embodiments, changing the mobility configuration may comprise changing one or more mobility thresholds between a source beam and/or cell and a target beam and/or cell. In certain embodiments, the method may further comprise sending a description of the changes to the mobility configuration to the target node to enable a coordinated change of mobility parameters. In certain embodiments, the method may further comprise sending the successful handover report from a gNB-CU at the source node to a gNB-DU at the source node to allow the gNB-DU to determine whether to perform one or more optimization actions. In certain embodiments, the one or more optimization actions may comprise one or more of: reconfiguring one or more beams with radio link monitoring issues; re-distributing one or more beams in terms of coverage; expanding coverage of one or more beams; and changing a number of beams serving an area.

In certain embodiments, the network node 660 transmits to wireless device 610 a configuration for the successful handover report. The configuration may include at least one successful handover triggering condition.

In certain embodiments, the method may further comprise obtaining user data and forwarding the user data to a host computer or a wireless device.

Figure 23:
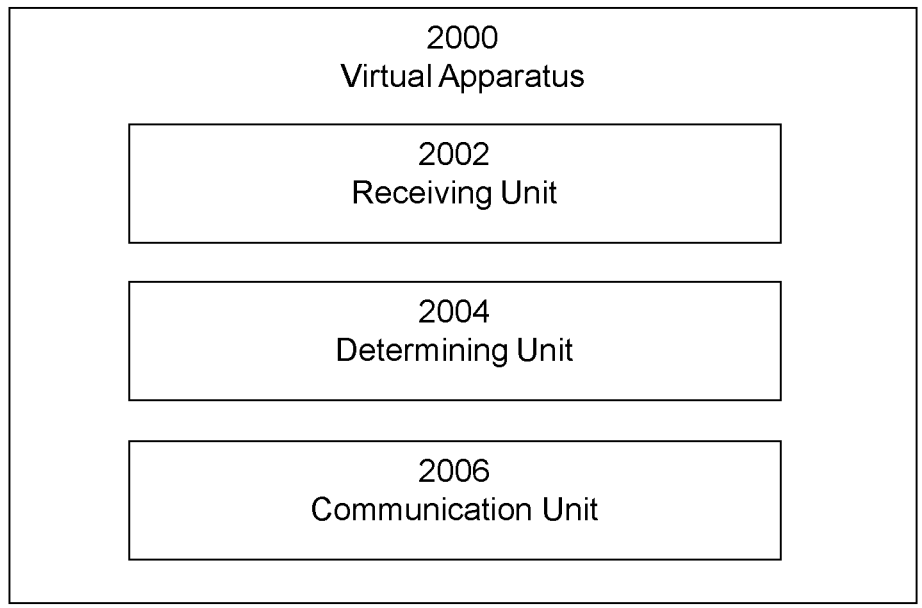
FIG. 23 illustrates another exemplary virtual computing device, according to certain embodiments.

FIG. 23 illustrates a schematic block diagram of an apparatus 2000 in a wireless network (for example, the wireless network shown in FIG. 7). The apparatus may be implemented in a network node (e.g., network node 660 shown in FIG. 7). Apparatus 2000 is operable to carry out the example method described with reference to FIG. 22 and possibly any other processes or methods disclosed herein. It is also to be understood that the method of FIG. 22 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2002, determining unit 2004, communication unit 2006, and any other suitable units of apparatus 2000 to perform corresponding functions according one or more embodiments of the present disclosure.

In certain embodiments, apparatus 2000 may be an eNB or a gNB. As illustrated in FIG. 23, apparatus 2000 includes receiving unit 2002, determining unit 2004, and communication unit 2006. Receiving unit 2002 may be configured to perform the receiving functions of apparatus 2000. For example, receiving unit 2002 may be configured to receive a successful handover report associated with a successful handover by a wireless device.

As another example, in certain embodiments apparatus 2000 may be a target node. In such a scenario, receiving unit 2002 may be configured to receive the successful handover report associated with the successful handover from the wireless device.

As still another example, in certain embodiments apparatus 2000 may be a source node. In such a scenario, receiving unit 2002 may be configured to receive the successful handover report associated with the successful handover from a target node.

As another example, in certain embodiments receiving unit 2002 may be configured to obtain user data.

Receiving unit 2002 may receive any suitable information (e.g., from a wireless device or another network node). Receiving unit 2002 may include a receiver and/or a transceiver, such as RF transceiver circuitry 672 described above in relation to FIG. 8. Receiving unit 2002 may include circuitry configured to receive messages and/or signals (wireless or wired). In particular embodiments, receiving unit 2002 may communicate received messages and/or signals to determining unit 2004 and/or any other suitable unit of apparatus 2000. The functions of receiving unit 2002 may, in certain embodiments, be performed in one or more distinct units.

Determining unit 2004 may perform the processing functions of apparatus 2000. For example, determining unit 2004 may be configured to perform one or more operations based on information in the successful handover report. For instance, in certain embodiments apparatus 2000 may be a target node, and determining unit 2004 may be configured to send the successful handover report to a source node (e.g., via communication unit 2006). As another example, determining unit 2004 may be configured to determine one or more issues associated with successful handover to a source node and indicate the one or more issues associated with successful handover to a source node (e.g., via communication unit 2006).

In certain embodiments, apparatus 2000 may be a source node. In such a scenario, determining unit 2004 may be configured to identify one or more near radio link failure cases to assess handover triggering conditions. As another example, determining unit 2004 may be configured to determine whether a mobility configuration should be adjusted, and change the mobility configuration in response to determining that the mobility configuration should be adjusted. In certain embodiments, determining unit 2004 may be configured to change one or more mobility thresholds between a source beam and/or cell and a target beam and/or cell. As another example, in certain embodiments determining unit 2004 may be configured to perform one or more optimization actions. For instance, in certain embodiments determining unit 2004 may be configured to perform one or more of: reconfigure one or more beams with radio link monitoring issues; re-distribute one or more beams in terms of coverage; expanding coverage of one or more beams; and change a number of beams serving an area.

As another example, in certain embodiments determining unit 2004 may be configured to obtain user data.

Determining unit 2004 may include or be included in one or more processors, such as processing circuitry 670 described above in relation to FIG. 8. Determining unit 2004 may include analog and/or digital circuitry configured to perform any of the functions of determining unit 2004 and/or processing circuitry 170 described above. The functions of determining unit 2004 may, in certain embodiments, be performed in one or more distinct units.

Communication unit 2006 may be configured to perform the transmission functions of apparatus 2000. For example, in certain embodiments apparatus 2000 may be a target node. In such a scenario, communication unit 2006 may be configured to send a request for the successful handover report to the wireless device. As another example, communication unit 2006 may be configured to send the successful handover report to a source node. As still another example, communication unit 2006 may be configured to indicate one or more issues associated with successful handover to a source node.

In certain embodiments, apparatus 2000 may be a source node. In such a scenario, communication unit 2006 may be configured to send a description of the changes to the mobility configuration to the target node to enable a coordinated change of mobility parameters. As another example, in certain embodiments communication unit 2006 may be configured to send the successful handover report from a gNB-CU at the source node to a gNB-DU at the source node to allow the gNB-DU to determine whether to perform one or more optimization actions.

As another example, in certain embodiments communication unit 2006 may be configured to forward the user data to a host computer or a wireless device.

Communication unit 2006 may transmit messages (e.g., to a wireless device and/or another network node). Communication unit 2006 may include a transmitter and/or a transceiver, such as RF transceiver circuitry 672 described above in relation to FIG. 8. Communication unit 2006 may include circuitry configured to transmit messages and/or signals (e.g., through wireless or wired means). In particular embodiments, communication unit 2006 may receive messages and/or signals for transmission from determining unit 2004 or any other unit of apparatus 2000. The functions of communication unit 2004 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EXAMPLE EMBODIMENTS

Example Embodiment 1. A method performed by a wireless device, the method comprising: in response to a successful handover procedure, generating a successful handover report comprising state information of the wireless device; and transmitting the successful handover report to a target cell.

Example Embodiment 2. The method of embodiment 1, further comprising: receiving a configuration for the successful handover report.

Example Embodiment 3. The method of any of embodiments 1-2, further comprising: determining whether a successful handover report trigger condition has been met.

Example Embodiment 4. The method of any of embodiments 1-3, further comprising: receiving a request for the successful handover report from the target cell; and wherein the successful handover report is transmitted to the target cell in response to the received request.

Example Embodiment 5. The method of any of embodiments 1-4, wherein the successful handover report comprises information related to a source cell or the target cell.

Example Embodiment 6. The method of any of embodiments 1-5, wherein the successful handover report comprises information indicating that the wireless device is in near-RLF condition.

Example Embodiment 7. The method of any of embodiments 1-6, wherein the successful handover report comprises information about one or more radio link monitoring-related timers.

Example Embodiment 8. The method of any of embodiments 1-7, wherein the successful handover report comprises information about a radio link control retransmission counter.

Example Embodiment 9. The method of any of embodiments 1-8, further comprising logging one or more measurements related to a beam failure detection procedure on a serving cell.

Example Embodiment 10. The method of any of embodiments 1-9, wherein the successful handover report comprises one or more of: one or more beam identities for which random access channel access was attempted; and for each beam identity, a number of random access channel access attempts.

Example Embodiment 11. The method of any of embodiments 1-10, wherein the successful handover report comprises one or more of: sensor captured data or measurements; and a speed state of the wireless device.

Example Embodiment 12. The method of any of embodiments 1-11, wherein the successful handover report comprises one or more of: one or more reference signal received power measurements for configured reference signals at the time of successful handover; one or more reference signal received quality measurements for configured reference signals at the time of successful handover; and one or more signal-to-interference-plus-noise ratio measurements for configured reference signals at the time of successful handover.

Example Embodiment 13. The method of any of embodiments 1-12, wherein the successful handover report comprises position information at the time of successful handover.

Example Embodiment 14. The method of any of embodiments 1-13, wherein the successful handover report is included in a Handover Complete message (RRCReconfigurationComplete) sent over radio resource control from the wireless device to the target cell.

Example Embodiment 15. The method of any of embodiments 1-14, further comprises indicating presence of successful handover report to the network using a binary flag.

Example Embodiment 16. The method of any of embodiments 1-13, wherein the successful handover report is including in a RRCRe-establishmentRequest message.

Example Embodiment 17. The method of any of embodiments 1-16, further comprising: providing user data; and forwarding the user data to a host computer via the transmission to the base station.

Example Embodiment 18. A method performed by a network node, the method comprising: receiving a successful handover report associated with a successful handover by a wireless device; and performing one or more operations based on information in the successful handover report.

Example Embodiment 19. The method of embodiment 18, wherein the successful handover report comprises information related to a source cell or a target cell.

Example Embodiment 20. The method of any of embodiments 18-19, wherein the successful handover report comprises information indicating that the wireless device is in near-RLF condition.

Example Embodiment 21. The method of any of embodiments 18-20, wherein the successful handover report comprises information about one or more radio link monitoring-related timers.

Example Embodiment 22. The method of any of embodiments 18-21, wherein the successful handover report comprises information about a radio link control retransmission counter.

Example Embodiment 23. The method of any of embodiments 18-22, wherein the successful handover report comprises one or more measurements related to a beam failure detection procedure.

Example Embodiment 24. The method of any of embodiments 18-23, wherein the successful handover report comprises one or more of: one or more beam identities for which random access channel access was attempted; and for each beam identity, a number of random access channel access attempts.

Example Embodiment 25. The method of any of embodiments 18-24, wherein the successful handover report comprises one or more of: sensor captured data or measurements; and a speed state of the wireless device.

Example Embodiment 26. The method of any of embodiments 18-25, wherein the successful handover report comprises one or more of: one or more reference signal received power measurements for configured reference signals at the time of successful handover; one or more reference signal received quality measurements for configured reference signals at the time of successful handover; and one or more signal-to-interference-plus-noise ratio measurements for configured reference signals at the time of successful handover.

Example Embodiment 27. The method of any of embodiments 18-26, wherein the successful handover report comprises position information at the time of successful handover.

Example Embodiment 28. The method of any of embodiments 18-27, wherein the network node is a target node, and the method comprises receiving the successful handover report associated with the successful handover from the wireless device.

Example Embodiment 29. The method of embodiment 28, further comprising: sending a request for the successful handover report to the wireless device; and wherein the successful handover report is received in response to the request.

Example Embodiment 30. The method of any of embodiments 28-29, wherein the successful handover report is included in a Handover Complete message (RRCReconfigurationComplete) sent over radio resource control from the wireless device to the target node.

Example Embodiment 31. The method of any of embodiments 28-29, wherein the successful handover report is including in a RRCRe-establishmentRequest message.

Example Embodiment 32. The method of any of embodiments 28-31, wherein performing one or more operations based on information in the successful handover report comprises: sending the successful handover report to a source node.

Example Embodiment 33. The method of any of embodiments 28-32, wherein performing one or more operations based on information in the successful handover report comprises: indicating one or more issues associated with successful handover to a source node.

Example Embodiment 34. The method of any of embodiments 18-27, wherein the network node is a source node and the method comprises receiving the successful handover report associated with the successful handover from a target node.

Example Embodiment 35. The method of embodiment 34, wherein performing one or more operations based on information in the successful handover report comprises: identifying one or more near radio link failure cases to assess handover triggering conditions.

Example Embodiment 36. The method of any of embodiments 34-35, wherein performing one or more operations based on information in the successful handover report comprises: determining whether a mobility configuration should be adjusted; and changing the mobility configuration in response to determining that the mobility configuration should be adjusted.

Example Embodiment 37. The method of embodiment 36, wherein changing the mobility configuration comprises: changing one or more mobility thresholds between a source beam and/or cell and a target beam and/or cell.

Example Embodiment 38. The method of any of embodiments 34-37, further comprising: sending a description of the changes to the mobility configuration to the target node to enable a coordinated change of mobility parameters.

Example Embodiment 39. The method of any of embodiments 34-38, further comprising: sending the successful handover report from a gNB-CU at the source node to a gNB-DU at the source node to allow the gNB-DU to determine whether to perform one or more optimization actions.

Example Embodiment 40. The method of embodiment 39, wherein the one or more optimization actions comprise one or more of: reconfiguring one or more beams with radio link monitoring issues; re-distributing one or more beams in terms of coverage; expanding coverage of one or more beams; and changing a number of beams serving an area.

Example Embodiment 41. The method of any of the previous embodiments, further comprising: obtaining user data; and forwarding the user data to a host computer or a wireless device.

Example Embodiment 42. A wireless device, the wireless device comprising: processing circuitry configured to perform any of the steps of any one of Example Embodiments 1 to 17; and power supply circuitry configured to supply power to the wireless device.

Example Embodiment 43. A network node, the network node comprising: processing circuitry configured to perform any of the steps of any one of Example Embodiments 18 to 41; power supply circuitry configured to supply power to the wireless device.

Example Embodiment 44. A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any one of Example Embodiments 1 to 17; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 45. A computer program, the computer program comprising instructions which when executed on a computer perform any of the steps of any one of Example Embodiments 1 to 17.

Example Embodiment 46. A computer program product comprising a computer program, the computer program comprising instructions which when executed on a computer perform any of the steps of any one of Example Embodiments 1 to 17.

Example Embodiment 47. A non-transitory computer-readable storage medium or carrier comprising a computer program, the computer program comprising instructions which when executed on a computer perform any of the steps of any one of Example Embodiments 1 to 17.

Example Embodiment 48. A computer program, the computer program comprising instructions which when executed on a computer perform any of the steps of any one of Example Embodiments 18 to 41.

Example Embodiment 49. A computer program product comprising a computer program, the computer program comprising instructions which when executed on a computer perform any of the steps of any one of Example Embodiments 18 to 41.

Example Embodiment 50. A non-transitory computer-readable storage medium or carrier comprising a computer program, the computer program comprising instructions which when executed on a computer perform any of the steps of any one of Example Embodiments 18 to 41.

Example Embodiment 51. A communication system including a host computer comprising: processing circuitry configured to provide user data; and a communication interface configured to forward the user data to a cellular network for transmission to a user equipment (UE), wherein the cellular network comprises a network node having a radio interface and processing circuitry, the network node's processing circuitry configured to perform any of the steps of any one of Example Embodiments 18 to 41.

Example Embodiment 52. The communication system of the pervious embodiment further including the network node.

Example Embodiment 53. The communication system of the previous 2 embodiments, further including the UE, wherein the UE is configured to communicate with the network node.

Example Embodiment 54. The communication system of the previous 3 embodiments, wherein: the processing circuitry of the host computer is configured to execute a host application, thereby providing the user data; and the UE comprises processing circuitry configured to execute a client application associated with the host application.

Example Embodiment 55. A method implemented in a communication system including a host computer, a network node and a user equipment (UE), the method comprising: at the host computer, providing user data; and at the host computer, initiating a transmission carrying the user data to the UE via a cellular network comprising the network node, wherein the network node performs any of the steps of any one of Example Embodiments 18 to 41.

Example Embodiment 56. The method of the previous embodiment, further comprising, at the network node, transmitting the user data.

Example Embodiment 57. The method of the previous 2 embodiments, wherein the user data is provided at the host computer by executing a host application, the method further comprising, at the UE, executing a client application associated with the host application.

Example Embodiment 58. A user equipment (UE) configured to communicate with a network node, the UE comprising a radio interface and processing circuitry configured to performs the of the previous 3 embodiments.

Example Embodiment 59. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any one of Example Embodiments 1 to 17.

Example Embodiment 60. The communication system of the previous embodiment, wherein the cellular network further includes a network node configured to communicate with the UE.

Example Embodiment 61. The communication system of the previous 2 embodiments, wherein: the processing circuitry of the host computer is configured to execute a host application, thereby providing the user data; and the UE's processing circuitry is configured to execute a client application associated with the host application.

Example Embodiment 62. A method implemented in a communication system including a host computer, a network node and a user equipment (UE), the method comprising: at the host computer, providing user data; and at the host computer, initiating a transmission carrying the user data to the UE via a cellular network comprising the network node, wherein the UE performs any of the steps of any one of Example Embodiments 1 to 17.

Example Embodiment 63. The method of the previous embodiment, further comprising at the UE, receiving the user data from the network node.

Example Embodiment 64. A communication system including a host computer comprising: communication interface configured to receive user data originating from a transmission from a user equipment (UE) to a network node, wherein the UE comprises a radio interface and processing circuitry, the UE's processing circuitry configured to perform any of the steps of any one of Example Embodiments 1 to 17.

Example Embodiment 65. The communication system of the previous embodiment, further including the UE.

Example Embodiment 66. The communication system of the previous 2 embodiments, further including the network node, wherein the network node comprises a radio interface configured to communicate with the UE and a communication interface configured to forward to the host computer the user data carried by a transmission from the UE to the network node.

Example Embodiment 67. The communication system of the previous 3 embodiments, wherein: the processing circuitry of the host computer is configured to execute a host application; and the UE's processing circuitry is configured to execute a client application associated with the host application, thereby providing the user data.

Example Embodiment 68. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 69. A method implemented in a communication system including a host computer, a network node and a user equipment (UE), the method comprising: at the host computer, receiving user data transmitted to the network node from the UE, wherein the UE performs any of the steps of any one of Example Embodiments 1 to 17.

Example Embodiment 70. The method of the previous embodiment, further comprising, at the UE, providing the user data to the network node.

Example Embodiment 71. The method of the previous 2 embodiments, further comprising: at the UE, executing a client application, thereby providing the user data to be transmitted; and at the host computer, executing a host application associated with the client application.

Example Embodiment 72. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 73. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any one of Example Embodiments 18 to 41.

Example Embodiment 74. The communication system of the previous embodiment further including the network node.

Example Embodiment 75. The communication system of the previous 2 embodiments, further including the UE, wherein the UE is configured to communicate with the network node.

Example Embodiment 76. The communication system of the previous 3 embodiments, wherein: the processing circuitry of the host computer is configured to execute a host application; the UE is configured to execute a client application associated with the host application, thereby providing the user data to be received by the host computer.

Example Embodiment 77. A method implemented in a communication system including a host computer, a network node and a user equipment (UE), the method comprising: at the host computer, receiving, from the network node, user data originating from a transmission which the network node has received from the UE, wherein the UE performs any of the steps of any one of Example Embodiments 1 to 17.

Example Embodiment 78. The method of the previous embodiment, further comprising at the network node, receiving the user data from the UE.

Example Embodiment 79. The method of the previous 2 embodiments, further comprising at the network node, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method performed by a wireless device for Radio Link Failures (RLF) during handovers in a New Radio (NR) access, the method comprising:
   in response to a successful handover procedure, compiling a successful handover report comprising state information of the wireless device, the successful handover report comprising information indicating that the wireless device is in near-RLF condition and information about a radio link control (RLC) retransmission counter, the successful handover procedure occurring before reaching a maximum RLC retransmission counter; and transmitting the successful handover report to a target cell.

2. The method of claim 1, further comprising:

receiving a configuration for the successful handover report, the configuration comprising at least one successful handover triggering condition.

3. A method performed by a network node for Radio Link Failures (RLF) during handovers in a New Radio (NR) access, the method comprising:

receiving a successful handover report associated with a successful handover by a wireless device, the successful handover report comprising information indicating that the wireless device is in near-RLF condition and information about a radio link control (RLC) retransmission counter, the successful handover procedure occurring before reaching a maximum RLC retransmission counter; and performing one or more operations based on information in the successful handover report.

4. A wireless device configured for Radio Link Failures (RLF) during handovers in a New Radio (NR) access comprising:

processing circuitry configured to:

in response to a successful handover procedure, compile a successful handover report comprising state information of the wireless device, the successful handover report comprising information indicating that the wireless device is in near-RLF condition and information about a radio link control (RLC) retransmission counter, the successful handover procedure occurring before reaching a maximum RLC retransmission counter; and transmit the successful handover report to a target cell.

5. The wireless device of claim 4, wherein the processing circuitry is configured to receive a configuration for the successful handover report, the configuration comprising at least one successful handover triggering condition.

6. The wireless device of claim 4, wherein the processing circuitry is configured to determine whether at least one successful handover report trigger condition has been met.

7. The wireless device of claim 4, wherein the processing circuitry is configured to receive a request for the successful handover report from the target cell, and wherein the successful handover report is transmitted to the target cell in response to the received request.

8. The wireless device of claim 4, wherein the successful handover report comprises information related to at least one of a source cell and the target cell.

9. The wireless device of claim 4, wherein the successful handover report comprises information about one or more radio link monitoring-related timers.

10. The wireless device of claim 4, wherein the successful handover report comprises information about one or more mobility related timers.

11. The wireless device of claim 4, wherein the processing circuitry is configured to log one or more measurements related to one or more beams configured for a beam failure detection procedure on a source cell.

12. The wireless device of claim 4, wherein the successful handover report comprises information about beam failure detection counters.

13. The wireless device of claim 4, wherein the successful handover report comprises one or more of:

one or more beam identities for which random access channel access was attempted;

for each beam identity, a number of random access channel access attempts;

sensor captured data or measurements; and a speed state of the wireless device; and position information associated with the wireless device at the time of successful handover.

14. The method of claim 4, wherein the successful handover report comprises one or more of:

one or more reference signal received power measurements for configured reference signals for beam failure detection or radio link failure monitoring or beam failure recovery procedures at the time of successful handover;

one or more reference signal received quality measurements for configured reference signals for beam failure detection or radio link failure monitoring or beam failure recovery procedures at the time of successful handover; and one or more signal-to-interference-plus-noise ratio measurements for configured reference signals for beam failure detection or radio link failure monitoring or beam failure recovery procedures at the time of successful handover.

15. The wireless device of claim 4, wherein the successful handover report is included in a Handover Complete message (RRCReconfigurationComplete) sent over radio resource control from the wireless device to the target cell.

16. The wireless device of claim 4, wherein the processing circuitry is configured to indicate presence of successful handover report to the network using a binary flag.

17. The wireless device od claim 4 wherein the successful handover report is including in a RRCRe-establishmentRequest message.

18. A network node for Radio Link Failures (RLF) during handovers in a New Radio (NR) access comprising:

processing circuitry configured to:

receive a successful handover report associated with a successful handover by a wireless device, the successful handover report comprising information indicating that the wireless device is in near-RLF condition and information about a radio link control (RLC) retransmission counter, the successful handover procedure occurring before reaching a maximum RLC retransmission counter; and perform one or more operations based on information in the successful handover report.

* * * * *